(12) United States Patent
Matsumoto

(10) Patent No.: US 12,534,296 B2
(45) Date of Patent: Jan. 27, 2026

(54) TRAVELING VEHICLE SYSTEM AND TRAVELING VEHICLE CONTROL METHOD

(71) Applicant: MURATA MACHINERY, LTD., Kyoto (JP)

(72) Inventor: Atsushi Matsumoto, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 576 days.

(21) Appl. No.: 17/927,379

(22) PCT Filed: Apr. 20, 2021

(86) PCT No.: PCT/JP2021/015993
§ 371 (c)(1),
(2) Date: Nov. 23, 2022

(87) PCT Pub. No.: WO2021/241079
PCT Pub. Date: Dec. 2, 2021

(65) Prior Publication Data
US 2023/0242166 A1    Aug. 3, 2023

(30) Foreign Application Priority Data

May 27, 2020 (JP) ................. 2020-092386

(51) Int. Cl.
*B65G 1/137*    (2006.01)
*H01L 21/677*    (2006.01)

(52) U.S. Cl.
CPC ........ *B65G 1/137* (2013.01); *H01L 21/67715* (2013.01); *H01L 21/67724* (2013.01); *H01L 21/67733* (2013.01)

(58) Field of Classification Search
CPC .............. B65G 1/137; H01L 21/67715; H01L 21/67724; H01L 21/67733
See application file for complete search history.

(56) References Cited

U.S. PATENT DOCUMENTS 9,758,308 B1 *   9/2017   Nishikawa ........ H01L 21/67715
2011/0106341 A1   5/2011   Kinoshita
(Continued)

FOREIGN PATENT DOCUMENTS

| CN | 106873605 A | 6/2017 |
| JP | 4172466 B2 | 10/2008 |
| JP | 5874942 B2 | 3/2016 |

OTHER PUBLICATIONS

Official Communication issued in International Patent Application No. PCT/JP2021/015993, mailed on Jul. 6, 2021.
(Continued)

*Primary Examiner* — Robert J McCarry, Jr.
(74) *Attorney, Agent, or Firm* — Keating & Bennett, LLP

(57) ABSTRACT

A traveling vehicle system includes a traveling path including a branching portion, a traveling vehicle to travel on the traveling path, and a controller. A specific area through which the traveling vehicle is allowed to pass on one of the traveling paths from an upstream side to a downstream side of the branching portion is in a portion within a blocking area including the branching portion. The controller is configured or programmed to transmit a passage permission for the blocking area to the traveling vehicle that issued the passage request for the blocking area if no other traveling vehicle is present in the blocking area, and to transmit a passage permission for the specific area to the traveling vehicle that issued the passage request for the specific area if no other traveling vehicle is present in the specific area. The traveling vehicle enters the blocking area or the specific area for which a passage permission has been acquired.

9 Claims, 36 Drawing Sheets

(56) References Cited

U.S. PATENT DOCUMENTS

| | | |
|---|---|---|
| 2015/0187218 A1 | 7/2015 | Harasaki |
| 2018/0222686 A1 | 8/2018 | Takahara et al. |
| 2019/0066511 A1 | 2/2019 | Yamane et al. |

OTHER PUBLICATIONS

Official Communication issued in corresponding European Patent Application No. 21812720.7, mailed on Mar. 22, 2024.

Official Communication issued in corresponding Chinese Patent Application No. 202180037832.9, mailed on Apr. 26, 2025, 10 pages.

\* cited by examiner

FIG. 4

| TRAVELING VEHICLE ID | CURRENT LOCATION | DESTINATION | TRAVELING STATE | LOAD STATE | FORWARD STATE | PASSAGE REQUEST | RELEASE REQUEST |
|---|---|---|---|---|---|---|---|
| ID0001 | LOCATION A | DESTINATION A | TRAVELING | 1, nID0003 | 1 | aID01, DIRECTION E | |
| ID0002 | LOCATION B | DESTINATION B | TRAVELING | 1, nID0011 | 0 | | aID01 |
| ID0003 | LOCATION C | DESTINATION C | STOPPED | 0 | 0 | aID01, DIRECTION E | |
| ... | ... | ... | ... | ... | ... | ... | ... |

TRAVELING VEHICLE SYSTEM AND TRAVELING VEHICLE CONTROL METHOD

BACKGROUND OF THE INVENTION

1. Field of the Invention

The present invention relates to a traveling vehicle system, and a traveling vehicle control method.

2. Description of the Related Art

Conventionally, in a semiconductor device manufacturing factory or the like, a traveling vehicle system for transporting loads accommodating semiconductor wafers or reticles is used. The traveling vehicle system has a plurality of traveling vehicles that travel on a traveling path and a controller that controls the traveling vehicles. The traveling vehicles transmit their position information on the traveling path to the controller by means of wireless communication or the like. The controller determines a traveling vehicle to handle transportation of a load based on the location of each traveling vehicle and transmits a traveling instruction to the determined traveling vehicle.

In the traveling vehicle system, in a case where there is a branching portion indicating that the traveling path is branching, a blocking area that allows entry of only one traveling vehicle may be set at the branching portion. Japanese Patent No. 4172466 discloses a technique for permitting and releasing the blocking of a lock point (corresponding to the "blocking area" mentioned above) exclusively for a trolley that is traveling.

SUMMARY OF THE INVENTION

In Japanese Patent No. 4172466, even if the situation does not actually hinder the passage of the traveling path, other trolleys are not allowed to enter the lock point as long as a trolley continues to be present at the lock point. As a result, it is difficult, with the conventional technique, to allow a traveling vehicle to efficiently pass through a branching portion.

Preferred embodiments of the present invention provide traveling vehicle systems and traveling vehicle control methods each capable of allowing traveling vehicles to efficiently pass through a branching portion.

A traveling vehicle system according to an aspect of a preferred embodiment of the present invention is a traveling vehicle system including a traveling path including a branching portion, a traveling vehicle to travel on the traveling path, and a controller, wherein a specific area through which the traveling vehicle is allowed to pass on one of the traveling paths from an upstream side to a downstream side of the branching portion is in a portion within a blocking area including the branching portion, the controller is configured or programmed to transmit, upon receiving a passage request for the blocking area from the traveling vehicle, a passage permission for the blocking area to the traveling vehicle that issued the passage request for the blocking area if no other traveling vehicle is present in the blocking area, the traveling vehicle enters the blocking area if the passage permission for the blocking area is acquired, the controller is configured or programmed to transmit, upon receiving a passage request for the specific area from the traveling vehicle, a passage permission for the specific area to the traveling vehicle that issued the passage request for the specific area if no other traveling vehicle is present in the specific area, and the traveling vehicle enters the specific area if the passage permission for the specific area is acquired.

A traveling vehicle control method according to an aspect of another preferred embodiment of the present invention is a method for controlling a traveling vehicle traveling on a traveling path including a branching portion, wherein a specific area through which the traveling vehicle is allowed to pass on one of the traveling paths from an upstream side to a downstream side of the branching portion is in a portion within a blocking area including the branching portion, the method including transmitting, upon receiving a passage request for the blocking area from the traveling vehicle, a passage permission for the blocking area to the traveling vehicle that issued the passage request for the blocking area if no other traveling vehicle is present in the blocking area, causing the traveling vehicle to enter the blocking area if the passage permission for the blocking area is acquired by the traveling vehicle, transmitting, upon receiving a passage request for the specific area from the traveling vehicle, a passage permission for the specific area to the traveling vehicle that issued the passage request for the specific area if no other traveling vehicle is present in the specific area, and causing the traveling vehicle to enter the specific area if the passage permission for the specific area is acquired by the traveling vehicle.

According to a traveling vehicle system of an aspect of a preferred embodiment of the present invention, a specific area through which the traveling vehicle is allowed to pass on one of the traveling paths from an upstream side to a downstream side of the branching portion is in a portion within a blocking area set to include the branching portion. According to the traveling vehicle system, in regard to a passage request for the specific area from the traveling vehicle, regardless of whether or not blocking is being enforced in the blocking area is present or not, a passage permission for the specific area is granted to the traveling vehicle that issued the passage request for the specific area if no other traveling vehicle is present in the specific area, and thus the traveling vehicle can efficiently pass through the branching portion.

In the traveling vehicle system of the above aspect, the traveling vehicle having acquired a passage permission for the blocking area may transmit a blocking release request for the specific area to the controller after having passed through the specific area within the blocking area, the controller may release the blocking of the specific area and set the specific area to allow passage therethrough, in response to the blocking release request for the specific area, the traveling vehicle having acquired a passage permission for the blocking area may transmit a blocking release request for the blocking area to the controller after having transmitted the blocking release request for the specific area and then passed through the blocking area, and the controller may release the blocking of the blocking area and set the blocking area to allow passage therethrough, in response to the blocking release request for the blocking area. According to such an aspect, even if a preceding traveling vehicle still remains in the blocking area after having passed through the specific area, the blocking of the specific area can be released, and thus the traveling vehicle can efficiently pass through the branching portion.

In the traveling vehicle system of the above aspect, the traveling path may include a first point that provides, at a location short of the branching portion, the traveling vehicle with branch information indicating a branching path being present, if the traveling vehicle acquires the branch information in a situation where the traveling vehicle has not acquired a passage permission for the blocking area or the specific area, the traveling vehicle may transmit a passage request for the specific area to the controller, and if the first point is present within the blocking area, a second point that is located short of the first point and is closer to the first point, among a plurality of points provided on the traveling path outside the blocking area, may be set to be able to provide the branch information to the traveling vehicle. According to such an aspect, the branch information can be acquired outside the blocking area, and it is thus possible to appropriately control passage requests for the blocking area or the specific area.

In the traveling vehicle system of the above aspect, if the traveling vehicle acquires a passage permission for the specific area in a situation where the traveling vehicle is traveling based on a travel segment between adjacent points on the traveling path and the second point has been set to be able to provide the branch information, the traveling vehicle may travel based on a virtual segment from the second point to a point on one of the traveling paths. According to such an aspect, a traveling vehicle that has traveled to a location short of the blocking area without having obtained a passage permission for the blocking area can switch its traveling route and continue to travel based on a virtual segment, and it is thus possible to reduce or prevent congestion of a plurality of traveling vehicles at a location short of the blocking area.

In the traveling vehicle system of the above aspect, the virtual segment may be preliminarily created and held in the traveling vehicle or the controller and may be fetched or may be acquired from the controller for use when the traveling vehicle acquires a passage permission for the specific area. According to such an aspect, the traveling vehicle or the controller holds the virtual segment required when a passage permission for the specific area is acquired, and thus the traveling vehicle can efficiently pass through the branching portion. In the traveling vehicle system of the above aspect, ahead of the other of the traveling paths may be a dead end, and the first point may be a switching point at which the traveling vehicle that has moved backward after entering the other of the traveling paths switches its traveling direction to the one of the traveling paths. According to such an aspect, even in a system in which there is a dead end ahead of a branching portion, the traveling vehicle can efficiently pass through the branching portion. In the traveling vehicle system of the above aspect, if the traveling vehicle does not acquire a passage permission for the blocking area after transmitting a passage request for the blocking area to the controller, the traveling vehicle may transmit a passage request for the specific area to the controller. According to such an aspect, situations where the traveling vehicle is unable to enter the blocking area are reduced, and it is thus possible to reduce or prevent congestion of a plurality of traveling vehicles at a location short of the blocking area. In the traveling vehicle system of the above aspect, if the traveling vehicle does not acquire a passage permission for the blocking area after transmitting a passage request for the blocking area to the controller, the traveling vehicle may transmit a passage request for the specific area to the controller while being at a stop. According to such an aspect, the number of traveling vehicles that are at a stop at a location short of the blocking area without having acquired a passage permission for the blocking area is reduced, and it is thus possible to reduce or prevent congestion of a plurality of traveling vehicles at a location short of the blocking area.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram showing an example of state information stored in the controller according to the first preferred embodiment of the present invention.

DETAILED DESCRIPTION OF THE PREFERRED EMBODIMENTS

Figure 1:
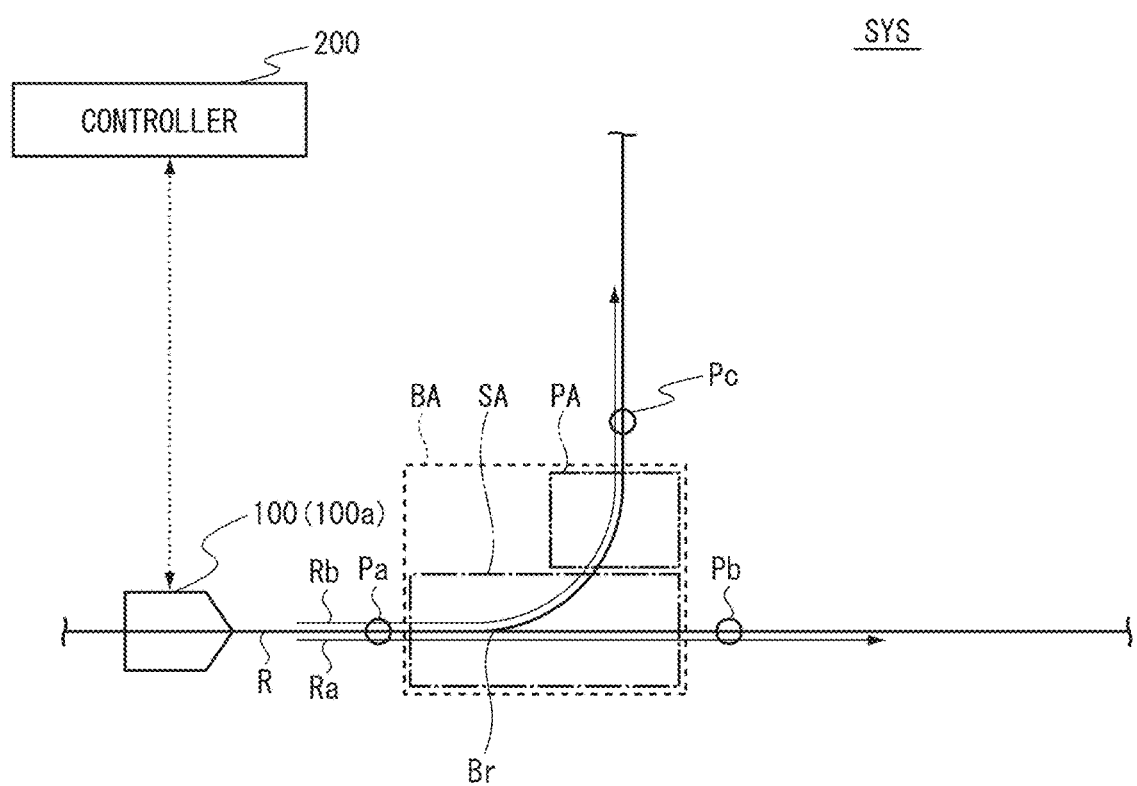
FIG. 1 is a diagram showing an example of a traveling vehicle system according to a first preferred embodiment of the present invention.

Hereunder, preferred embodiments will be described, with reference to the drawings. However, it should be noted that the present invention is not limited to the preferred embodiments described below. In the drawings, scale may be changed as necessary to illustrate the preferred embodiments, such as by enlarging, reducing or emphasizing a portion. In the drawings, an XYZ Cartesian coordinate system is used to describe directions in each drawing. In the XYZ Cartesian coordinate system, the vertical direction is taken as the Z direction, and the horizontal directions are taken as the X direction and the Y direction. In each direction (for example, X direction), the direction of the arrow is referred to as + side (for example, +X side), and the side opposite to the direction of the arrow is referred to as − side (for example, −X side).

First Preferred Embodiment

FIG. 1 is a diagram showing an example of a traveling vehicle system according to a first preferred embodiment. A traveling vehicle system SYS has a traveling path R including a branching portion Br, a traveling vehicle 100 traveling on the traveling path R, and a controller 200. The traveling vehicle system SYS is, for example, a transport system installed in a semiconductor device manufacturing factory or the like, and transports containers such as FOUPs (Front-Opening Unified Pod) accommodating semiconductor wafers used for manufacturing semiconductor devices, or reticle pods accommodating processing members such as reticles.

The traveling vehicle system SYS has a plurality of traveling vehicles 100. The traveling vehicle 100 is, for example, an overhead traveling vehicle. In the first preferred embodiment, the traveling vehicles 100 are each referred to as "traveling vehicle 100a" unless they are each distinguished and are referred to as "traveling vehicle 100a1", "traveling vehicle 100a2", and so on when they are each distinguished. The traveling path R is, for example, a traveling rail provided on a ceiling of a clean room or the like. The traveling path R includes a branching portion Br indicating that the traveling path is branching. That is to say, in the traveling path R, one traveling rail branches into a plurality of (for example, two) traveling rails from the branching portion Br. The traveling path R has, for example, a traveling path Ra that is one of traveling paths from the upstream side to the downstream side of the branching portion Br, and a traveling path Rb that is the other of the traveling paths from the upstream side to the downstream side of the branching portion Br.

The traveling vehicle 100a travels based on a travel segment between adjacent points on the traveling path R. Specifically, when traveling on the traveling path Ra, the traveling vehicle 100a travels based on a travel segment between a point Pa and a point Pb on the traveling path Ra, which are adjacent to each other. When traveling on the traveling path Rb, the traveling vehicle 100a travels based on a travel segment between a point Pa and a point Pc on the traveling path Rb, which are adjacent to each other. In the first preferred embodiment, at a location short of the branching portion Br, the point Pa can provide the traveling vehicle 100a with branch information indicating the presence of a branching path. Upon acquiring the branch information, the traveling vehicle 100a travels based on the travel segment corresponding to the traveling direction of the traveling vehicle 100a itself.

In the traveling vehicle system SYS, a blocking area BA including the branching portion Br is set. In a portion of the blocking area BA, a specific area SA through which the traveling vehicle 100a is allowed pass on the traveling path Ra is set. Within the blocking area BA, a predetermined area PA is set in a range different from that of the specific area SA. The predetermined area PA is an area that the traveling vehicle 100a enters when traveling on the traveling path Rb, however, it is an area that the traveling vehicle 100a never enters when traveling on the traveling path Ra. The point Pa, which can provide branch information, is not only a branching point, but also a permission-standby point for a passage permission when the traveling vehicle 100a enters the blocking area BA or the specific area SA. The permission-standby point is a point at which the traveling vehicle 100a scheduled to pass through the blocking area BA or the specific area SA stops when a passage permission cannot be obtained for either one of the areas. It should be noted that the point Pa corresponds to a "first point".

The traveling path R is provided adjacent to a processing apparatus not shown in the drawings, a stocker (automated warehouse) not shown in the drawings, or the like. The processing apparatus is, for example, an exposure apparatus, a coater/developer, a film forming apparatus, or an etching apparatus, and performs various processes on a semiconductor wafer in containers transported by the traveling vehicles 100a. The stocker stores the container transported by the traveling vehicle 100a. The traveling vehicle 100a may be a rail-guided trolley or the like that travels on the ground. In the case of a rail-guided trolley that travels on the ground, the traveling path R is provided on the floor or the like.

The traveling vehicle 100a transmits its own state information to the controller 200. The controller 200 generates a traveling instruction based on the state information received from the traveling vehicle 100a. The traveling vehicle 100a travels on the traveling path R upon receiving a traveling instruction from the controller 200. The traveling instruction includes information on the traveling route on which the traveling vehicle 100a transporting a load is scheduled to travel. The information on the traveling route is information that designates at least a portion of the traveling route from an origin point to a destination point of the traveling vehicle 100a.

The controller 200 controls permission for the traveling vehicle 100a that is scheduled to travel through (scheduled to pass through) the branching portion Br to enter the blocking area BA or the specific area SA. If entry to the blocking area BA is permitted by the controller 200, the traveling vehicle 100a enters the blocking area BA. On the other hand, if entry to the blocking area BA is not permitted by the controller 200, the traveling vehicle 100a stops at a location short of the blocking area BA (for example at the point Pa), or decelerates and travels toward the point Pa.

Similarly, if entry to the specific area SA is permitted by the controller 200, the traveling vehicle 100a enters the specific area SA. On the other hand, if entry to the specific area SA is not permitted by the controller 200, the traveling vehicle 100a stops at a location short of the specific area SA (for example at the point Pa), or decelerates and travels toward the point Pa. It should be noted that a permission to enter the specific area SA may, in some cases, be realized by a request from the traveling vehicle 100a that is not permitted to enter the blocking area BA.

In the configuration described above, the traveling vehicle 100a transmits to the controller 200 a passage request for the blocking area BA. That is to say, when the traveling vehicle 100a is scheduled to travel along the traveling path Rb, it passes through the specific area SA and the predetermined area PA, and it thus transmits a passage request for the blocking area BA to the controller 200. The controller 200 transmits, upon receiving the passage request for the blocking area BA from the traveling vehicle 100a, a passage permission for the blocking area BA to the traveling vehicle 100a that issued the passage request for the blocking area if no other traveling vehicle 100a is present in the blocking area BA.

The controller 200 can recognize the presence of the traveling vehicle 100a in the blocking area BA from the information that indicates the current location included in the state information received from each traveling vehicle 100a. The controller 200 can recognize the presence of the traveling vehicle 100a in the blocking area BA from the information that indicates whether or not blocking is being enforced in the blocking area BA. The traveling vehicle 100a enters the blocking area BA if passage permission for the blocking area BA is acquired. The traveling vehicle 100a that has entered the blocking area BA travels based on the travel segment between the point Pa and the point Pc.

The traveling vehicle 100a transmits to the controller 200 a passage request for the specific area SA. The passage request for the specific area SA is transmitted when the traveling vehicle 100a is to travel along the traveling path Ra. That is to say, when the traveling vehicle 100a is scheduled to travel along the traveling path Ra, it is sufficient to be able to only pass through the specific area SA, and the traveling vehicle 100a thus transmits a passage request for the specific area SA to the controller 200. Upon receiving the passage request for the specific area SA from the traveling vehicle 100a, the controller 200 transmits a passage permission for the specific area SA to the traveling vehicle 100a that issued the passage request for the specific area SA if no other traveling vehicle 100a is present in the specific area SA.

The controller 200 can recognize the presence of the traveling vehicle 100a in the specific area SA from the information that indicates the current location included in the state information received from each traveling vehicle 100a. The controller 200 can recognize the presence of the traveling vehicle 100a in the specific area SA from the information that indicates whether or not blocking is being enforced in the specific area SA. As described above, the predetermined area PA is set within a range that the traveling vehicle 100a never enters when traveling along the traveling path Ra. Therefore, even in the case where another traveling vehicle 100a is present in the predetermined area PA, the controller 200 transmits a passage permission for the specific area SA to the traveling vehicle 100a that issued the passage request for the specific area SA if no other traveling vehicle 100a is present in the specific area SA. The traveling vehicle 100a enters the specific area SA if a passage permission for the specific area SA is acquired. The traveling vehicle 100a that has entered the specific area SA travels based on the travel segment between the point Pa and the point Pb.

Even in the case where another traveling vehicle 100a is present in the predetermined area PA within the blocking area BA, the traveling vehicle system SYS permits the traveling vehicle 100a to pass through the specific area SA if no other traveling vehicle 100a is present in the specific area SA, and therefore, the traveling vehicle 100a can efficiently pass through the branching portion Br.

Figure 2:
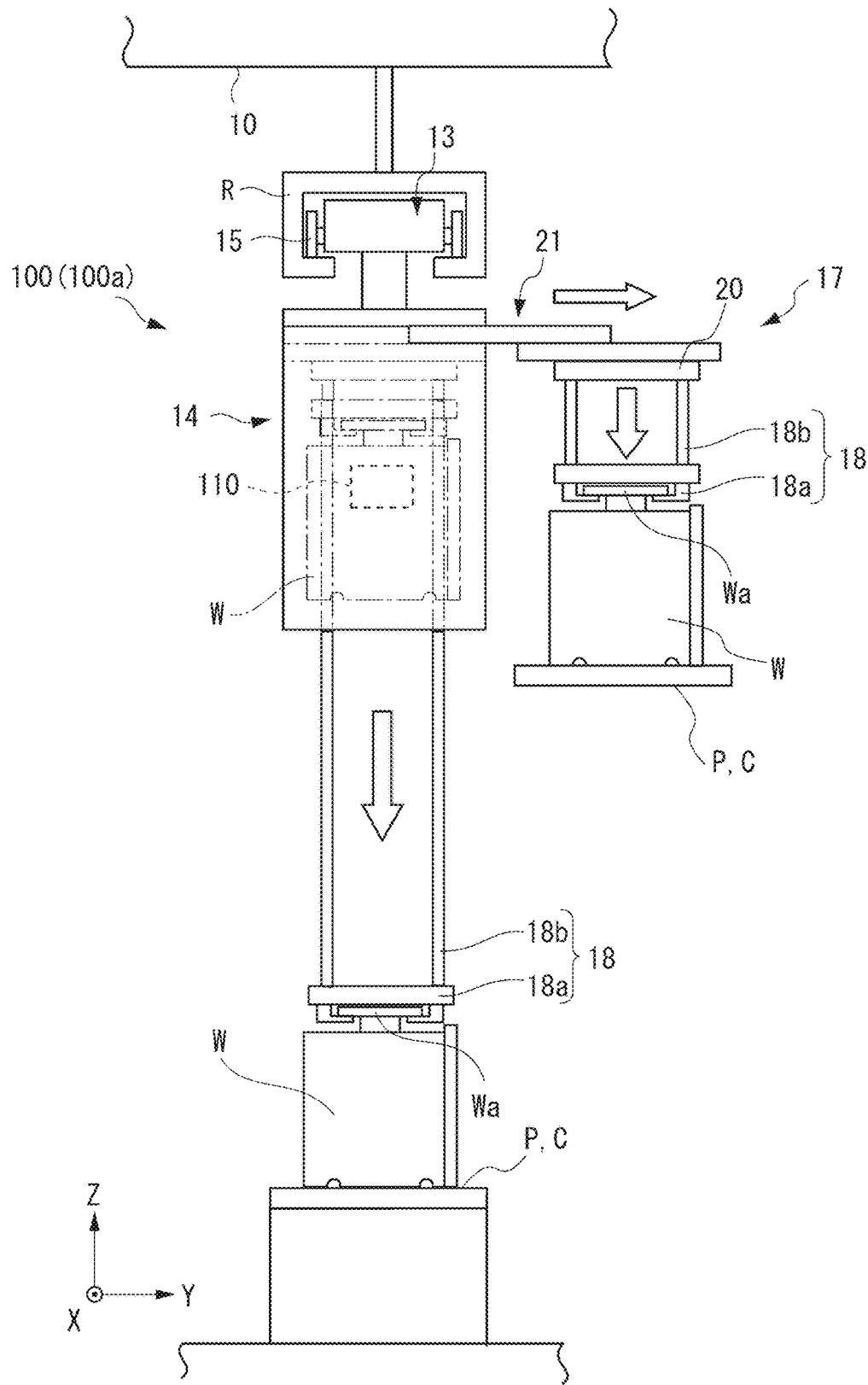
FIG. 2 is a diagram showing an example of a traveling vehicle according to the first preferred embodiment of the present invention.

FIG. 2 is a diagram showing an example of the traveling vehicle according to the first preferred embodiment. As shown in FIG. 2, the traveling vehicle 100a travels in the +X direction along the traveling path R suspended from a ceiling 10 of a building and picks up an article W at a pickup point arranged below or below and to the side of the traveling path R (in a direction including the Y direction). The traveling vehicle 100a unloads the article W at an unloading point arranged below or below and to the side of the traveling path R. The traveling vehicle 100a includes an in-vehicle device 110. The in-vehicle device 110 controls the traveling vehicle 100a according to instructions transmitted from the controller 200. The traveling vehicle 100a performs various operations under control of the in-vehicle device 110.

The traveling vehicle 100a includes a traveler 13 and a main body 14. The traveler 13 has wheels 15 and travels along the traveling path R via a driver 150, which will be described later. The main body 14 is provided in a state of being suspended below the traveler 13. The main body 14 includes a transferer 17. The transferer 17 has an article holder 18 that holds an article W, a lift driver 20 that raises or lowers the article holder 18, and a lateral extender 21 that moves the lift driver 20 to the lateral side of the traveling path R (in the +Y direction or the −Y direction).

The article holder 18 is, for example, a chuck having movable claws 18a, and inserts the claws 18a under a flange Wa of the article W to thus suspend and hold the article W. The article holder 18 is connected to suspenders 18b such as wires and belts. The lift driver 20 is, for example, a hoist, and raises or lowers the article holder 18 by feeding out or winding up the suspenders 18b. The lateral extender 21 causes a plurality of movable plates to slide to thus move the article holder 18 and the lift driver 20 to the lateral side of the traveling path R from the position where the article holder 18 and the lift driver 20 are stored in the main body 14. Pickup and unloading of the article W performed by the traveling vehicle 100a are executed using the article holder 18. Alternatively, pickup and unloading of the article W performed by the traveling vehicle 100a are executed using the lift driver 20 and the lateral extender 21. The in-vehicle device 110 controls the article holder 18, the lift driver 20, and the lateral extender 21.

When pickup of an article W is to be performed at a pickup point P, the in-vehicle device 110 causes the traveling vehicle 100a to stop so as to align with the location of the pickup point P and causes the lift driver 20 (the lift driver 20 and the lateral extender 21) to operate and move the article holder 18 to a predetermined position, thus instructing to pick up the article W at the pickup point P. Examples of the pickup point P include a load port of a processing apparatus or a stocker, and an overhead buffer provided with a shelf which is suspended from the ceiling 10 of the building and on which the article W can be placed.

When unloading of an article W is to be performed at an unloading point C, the in-vehicle device 110 causes the traveling vehicle 100a to stop so as to align with the location of the unloading point C and causes the lift driver 20 (the lift driver 20 and the lateral extender 21) to operate and move the article holder 18 to a predetermined position, thus instructing to unload the article W at the unloading point C. Examples of the unloading point C include a load port of a processing apparatus or a stocker, and an overhead buffer provided with a shelf which is suspended from the ceiling 10 of the building and on which the article W can be placed.

Figure 3:
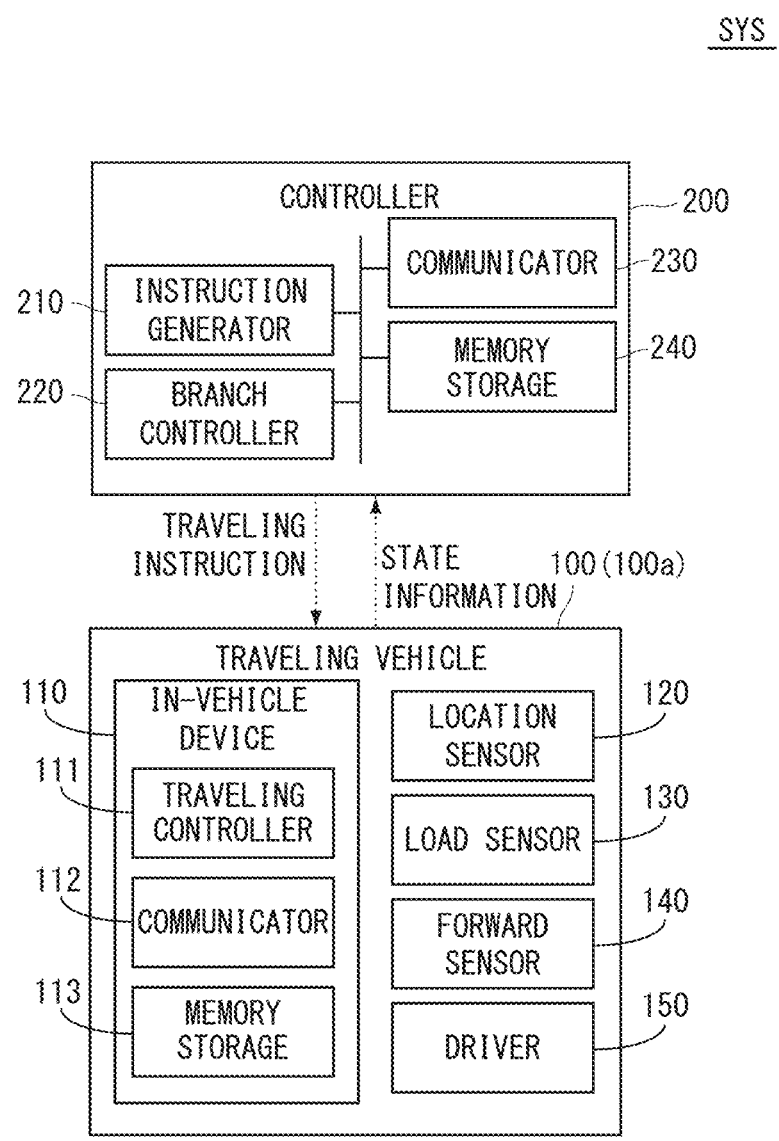
FIG. 3 is a block diagram showing a configuration example of the traveling vehicle and a controller according to the first preferred embodiment of the present invention.

FIG. 3 is a block diagram showing a configuration example of the traveling vehicle and the controller according to the first preferred embodiment. The traveling vehicle 100a has the in-vehicle device 110, a location sensor 120, a load sensor 130, a forward sensor 140, and the driver 150. The driver 150 supplies driving force for the traveling vehicle 100a to travel. Also, the driver 150 supplies driving force used for load handling such as pickup and unloading of a load (article W).

The location sensor 120 detects a current location of the traveling vehicle 100a. The location sensor 120 is communicably connected to the in-vehicle device 110 in a wired or wireless manner and supplies the detected current location of the traveling vehicle 100a to the in-vehicle device 110. For example, the location sensor 120 detects the current location of the traveling vehicle 100a in map information of the traveling path R by detecting a location marker at a point (for example, points Pa, Pb, Pc, and so on) provided on the traveling path R. The current location of the traveling vehicle 100a between points is determined from a traveled distance based on the speed and traveled time of the traveling vehicle 100a or a movement distance determined with the use of an encoder. The load sensor 130 detects the presence or absence of a load (article W). The load sensor 130 is communicably connected to the in-vehicle device 110 in a wired or wireless manner, and supplies detection results to the in-vehicle device 110.

The forward sensor 140 monitors forward of the traveling vehicle 100a in the advancing direction (traveling direction) and detects the presence of another traveling vehicle 100a ahead. The forward sensor 140 is communicably connected to the in-vehicle device 110 in a wired or wireless manner, and supplies detection results to the in-vehicle device 110. Each traveling vehicle 100a controls the traveling speed by detecting the presence of another traveling vehicle 100a ahead via the forward sensor 140 and can thus prevent collision with another traveling vehicle 100a ahead. It should be noted that one or both of the location sensor 120 and the forward sensor 140 may not be mounted on the traveling vehicle 100a, and may be provided, for example, on the traveling path R or the like. The traveling vehicle system SYS may not include at least one of the location sensor 120, the load sensor 130, and the forward sensor 140, and may include another type of sensor.

The in-vehicle device 110 is mounted on the traveling vehicle 100a and controls each portion of the traveling vehicle 100a upon traveling instructions from the controller 200. The in-vehicle device 110 has a traveling controller 111, a communicator 112, and a memory storage 113. The communicator 112 is communicably connected to a communicator 230 of the controller 200, which will be described later, via a wireless LAN (Local Area Network) or the like. The communicator 112 receives a traveling instruction from the communicator 230 of the controller 200 and stores the received traveling instruction in the memory storage 113.

The traveling controller 111 controls each portion of the traveling vehicle 100a based on the traveling instruction stored in the memory storage 113. For example, the traveling controller 111 controls the driver 150 based on a traveling route defined by the traveling instruction and causes the traveling vehicle 100a to travel along the traveling route. The traveling controller 111 causes various sensors (such as the location sensor 120) mounted on the traveling vehicle 100a to execute detections, and stores detection results in the memory storage 113.

The traveling controller 111 uses information stored in the memory storage 113 to generate state information of the traveling vehicle 100a. For example, the state information includes identification information for identifying a traveling vehicle 100a, as well as information related to current location, destination, traveling state, load state, forward state, passage request, and release request. The current location is information indicating the current location of the traveling vehicle 100a detected by the location sensor 120. As described above, the current location may be updated by taking the traveled distance into account with the current location of the traveling vehicle 100a detected by the location sensor 120. The destination is defined by a traveling instruction or the like stored in the memory storage 113 and is information indicating the destination of the traveling vehicle 100a.

The traveling state is information indicating the current speed of the traveling vehicle 100a. For example, the traveling state may indicate that the traveling vehicle 100a is traveling (for example, flag "1") if the speed is greater than "0", or that the traveling vehicle 100a is at a stop (for example, flag "0") if the speed is "0". The load state includes information indicating the presence or absence of a load (article W) detected by the load sensor 130 (for example, present: "1", absent: "0"), and information indicating the type of the load (article W) being transported (identification information for identifying the load). The forward state is information indicating whether or not another traveling vehicle 100a is present ahead of the traveling vehicle 100a itself within a detection range of the forward sensor 140 (for example, present "1", not present "0").

The passage request is identification information indicating a blocking area BA or a specific area SA through which the traveling vehicle 100a is requesting to pass. It should be noted that when the traveling vehicle 100a is not requesting passage, the passage request information includes information indicating that it is not requesting passage (or empty information, a NULL value, or the like). Moreover, the passage request may include the direction of passage (the advancing direction from the branching portion Br). For example, the direction of passage is information indicating the direction of the traveling path Ra or information indicating the direction of the traveling path Rb. In the first preferred embodiment, the direction of passage is the direction of the traveling path Rb in the case of a passage request for the blocking area BA and is the direction of the traveling path Ra in the case of a passage request for the specific area SA.

The release request is identification information indicating a blocking area BA or a specific area SA through which the traveling vehicle 100a has passed. The release request may include information indicating that the traveling vehicle 100a has passed through the blocking area BA or the specific area SA. It should be noted that when the traveling vehicle 100a is not requesting release, release request information includes information indicating that it is not requesting release (or empty information, a NULL value, or the like). Further, the release request may not be used in a case where a release request is only realized in a form in which the controller 200 recognizes the traveling vehicle 100a having passed through the blocking area BA or the specific area SA from the current location thereof.

The traveling controller 111 sets a traveling route based on a traveling instruction received from the controller 200 (for example, the origin and destination of the traveling vehicle 100a) and map information of the traveling path R stored preliminarily in the memory storage 113. The memory storage 113 is a non-volatile memory or the like and stores various information such as state information. The traveling controller 111 generates state information as necessary and updates the state information stored in the memory storage 113 to the latest state information. The communicator 112 transmits the state information stored in the memory storage 113 to the controller 200 (see FIG. 4). If a passage permission has not been received from the controller 200, the communicator 112 may transmit state information including a passage request to the controller 200 until a passage permission is granted. Even in a case where a passage request cannot be transmitted due to a temporary issue in communication and so forth, it is possible to more reliably transmit a passage request to the controller 200 by transmitting a passage request multiple times. The passage request may include the date and time of transmission. The communicator 112 may transmit a release request to the controller 200 multiple times. For example, the number of release request transmissions to be made may be decided preliminarily, and release request transmissions may only be made within a predetermined period of time.

The controller 200 has an instruction generator 210, a branch controller 220, a communicator 230, and a memory storage 240. The controller 200 is, for example, a computer device including a CPU (Central Processing Unit), a main memory, a memory storage device, a communication device, and so forth and processes various types of information. It should be noted that the configuration of the computer device is arbitrary, and it may include one device or a plurality of devices, for example. The communicator 230 can communicate with each traveling vehicle 100a via a wireless LAN or the like and receives state information from each traveling vehicle 100a. The memory storage 240 is a non-volatile memory or the like and stores information received by the communicator 230. For example, the memory storage 240 stores state information of each traveling vehicle 100a in association with identification information of each traveling vehicle 100a.

FIG. 4 is a diagram showing an example of state information stored in the controller according to the first preferred embodiment. As shown in FIG. 4, as state information, the memory storage 240 stores information of current location, destination, traveling state, load state, forward state, passage request, and release request in association with traveling vehicle ID, which is identification information for identifying each traveling vehicle 100a.

Based on information of the destination determined according to a preliminarily assigned task or the like (for example, transporting a load such as article W) and state information stored in the memory storage 240, the instruction generator 210 determines a traveling vehicle 100a to be assigned to execute a traveling instruction according to the task. The destination is, for example, an access point (such as a load port, buffer, incoming/outgoing port) where a load (article W) can be delivered to or received from the processing apparatus side or the stocker side. Based on the destination determined according to the task and the current location of the traveling vehicle 100a assigned to execute the task, the instruction generator 210 determines a traveling route for the traveling vehicle 100a and generates a traveling instruction that designates the determined route.

Based on the passage request included in the state information stored in the memory storage 240, the branch controller 220 determines whether to grant the traveling vehicle 100a a passage permission. Based on the release request included in the state information stored in the memory storage 240, the branch controller 220 releases blocking of the blocking area BA or the specific area SA.

When granting a passage permission or releasing blocking, the branch controller 220 generates (updates) blocking information. The blocking information is stored in the memory storage 240. The blocking information includes information related to blocking of each blocking area BA and each specific area SA included in each blocking area BA. The blocking information includes identification information for identifying each blocking area BA and each specific area SA. Moreover, the blocking information includes information indicating whether or not blocking is being enforced in each blocking area BA and each specific area SA. The blocking information further includes identification information that identifies the traveling vehicle 100*a* that has transmitted a passage request for each blocking area BA and each specific area SA. The information indicating whether or not blocking is enforced is information that indicates a state where blocking is being enforced in a blocking area BA and a specific area SA, or a state where blocking is not being enforced in these areas. Regarding the identification information that identifies the traveling vehicle 100*a* that has transmitted the passage request, the controller 200 is able to recognize the front-to-back positional relationship of traveling vehicles 100*a* based on the current location of each traveling vehicle 100*a*, and thus can grant passage permissions in sequence from the leading traveling vehicle 100*a* on the traveling path R. The controller 200 may determine the order of passage requests to be processed, based on the order of passage request transmissions (for example, order of date and time of transmission, order of date and time of reception).

In the case where passage requests for the same area are received from one traveling vehicle 100*a* at different timings, all of the passage requests from this traveling vehicle 100*a* are removed from the memory storage 240 at the time of granting a passage permission to this traveling vehicle 100*a*, so that the passage permission will not be granted in duplicate. Similarly, in the case where release requests for the same area are received from one traveling vehicle 100*a* at different timings, all of the release requests from this traveling vehicle 100*a* are removed from the memory storage 240 at the time of releasing the blocking of the concerned area, so that blocking will not be released inappropriately. In the case where a passage request for a blocking area BA and a passage request for a specific area SA included in the blocking area BA are received from one traveling vehicle 100*a* at different timings, the passage request received first is removed from the memory storage 240, so that a passage permission will not be granted for the passage request received later. As the state information stored in the memory storage 240 is updated, the branch controller 220 updates the blocking information stored in the memory storage 240 to the latest blocking information.

In response to the passage request included in the blocking information, the branch controller 220 determines whether to grant a passage permission to the traveling vehicle 100*a* corresponding to the identification information, based on one or both of the presence or absence of another traveling vehicle 100*a* in the concerned area (blocking area BA or specific area SA) and whether or not blocking is being enforced in the concerned area. The branch controller 220 checks the release request included in the state information stored in the memory storage 240 and updates the blocking information of the concerned area (blocking area BA or specific area SA). Here, updating blocking information includes updating the information indicating whether or not blocking is being enforced to information indicating that blocking is not being enforced, and removing the identification information identifying the traveling vehicle 100*a* that transmitted the passage request. The branch controller 220 may update the blocking information after having checked the current location of the traveling vehicle 100*a* that issued the release request.

Figure 5:
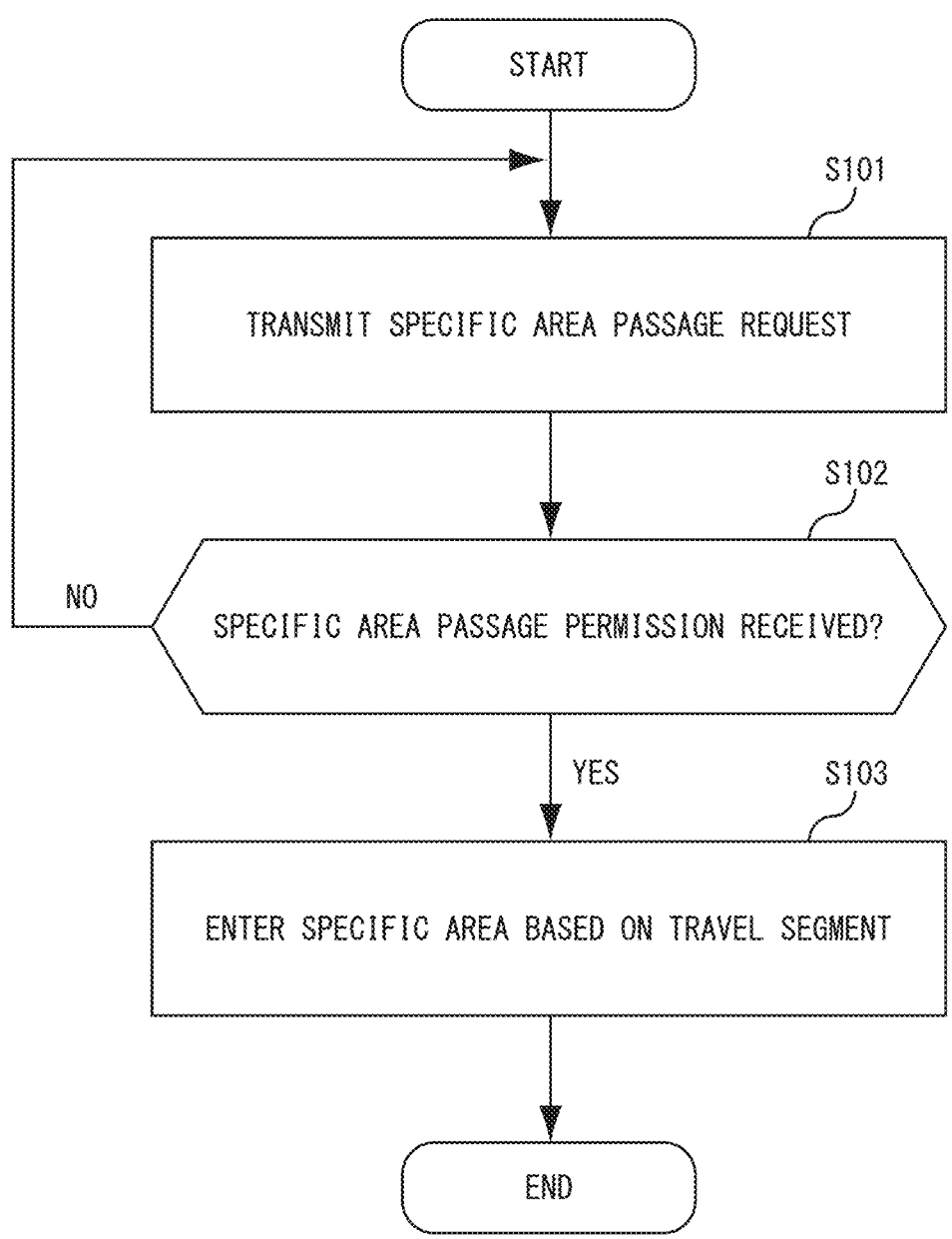
FIG. 5 is a flowchart showing an example of the flow of processing performed by the traveling vehicle when entering a specific area according to the first preferred embodiment of the present invention.

FIG. 5 is a flowchart showing an example of the flow of processing performed by the traveling vehicle when entering a specific area according to the first preferred embodiment. As shown in FIG. 5, the communicator 112 transmits to the controller 200 a passage request for the specific area SA (Step S101). Specifically, the traveling controller 111 generates state information including the identification information of the specific area SA as the passage request. The communicator 112 then transmits the state information generated by the traveling controller 111 to the controller 200.

The traveling controller 111 determines whether a passage permission for the specific area SA has been received (Step S102). Specifically, the traveling controller 111 determines whether the communicator 112 has received a passage permission for the specific area SA from the controller 200. At this time, if a passage permission for the specific area SA has been received (Step S102: YES), the traveling controller 111 causes the traveling vehicle to enter the specific area SA based on a travel segment (Step S103). Specifically, if the communicator 112 has received a passage permission for the specific area SA from the controller 200, the traveling controller 111 causes the traveling vehicle to enter the specific area SA according to the set traveling route.

On the other hand, if a passage permission for the specific area SA is determined as not having been received (Step S102: NO), the traveling controller 111 again executes the process of Step S101. Specifically, if the communicator 112 has not received a passage permission for the specific area SA from the controller 200, the traveling controller 111 instructs the communicator 112 to transmit the state information including the passage request for the specific area SA.

Figure 6:
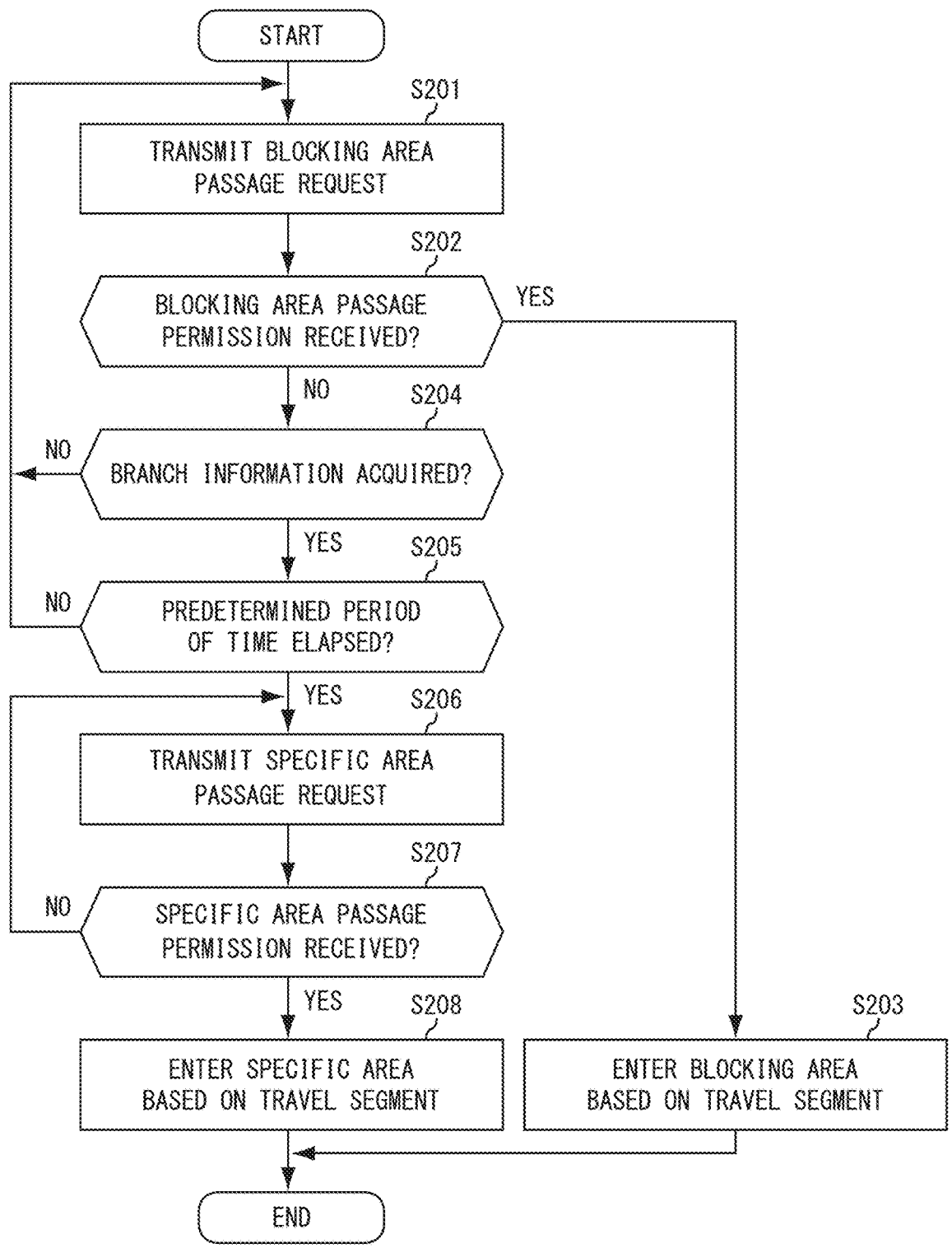
FIG. 6 is a flowchart showing an example of the flow of processing performed by the traveling vehicle when entering a blocking area or a specific area according to the first preferred embodiment of the present invention.
Figure 7:
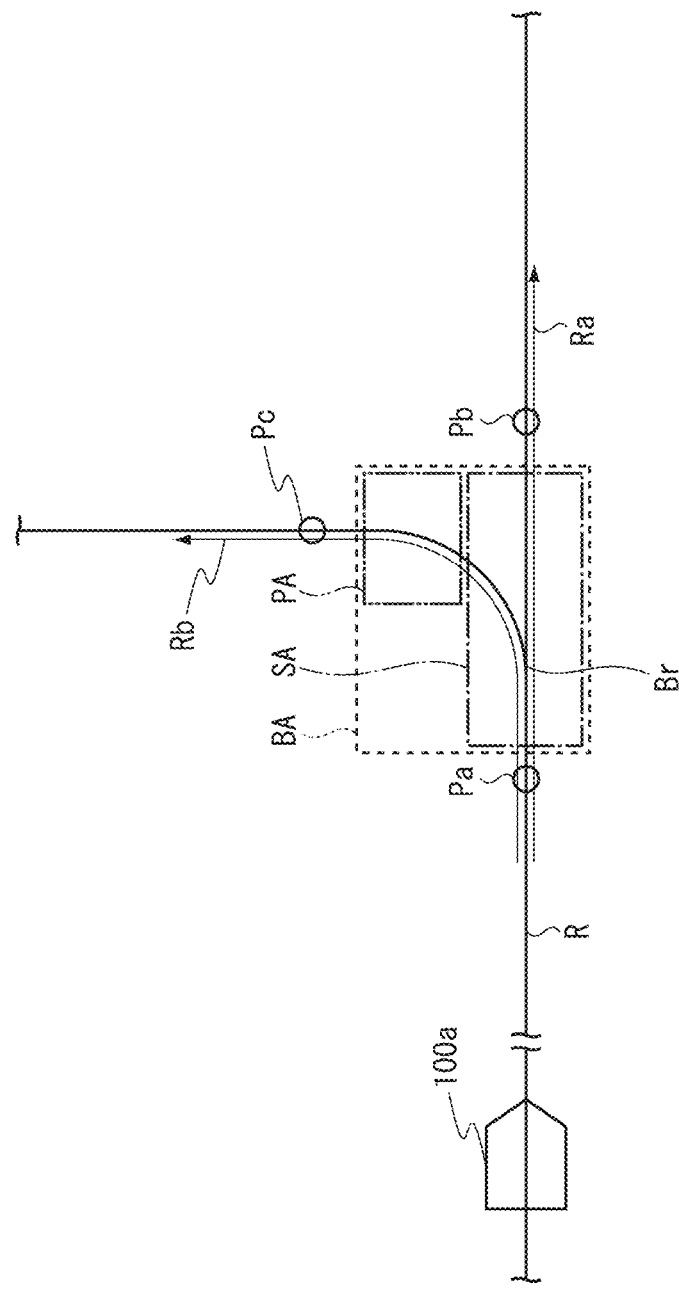
FIG. 7 is a diagram showing an example of the traveling vehicle entering the blocking area according to the first preferred embodiment of the present invention.
Figure 8:
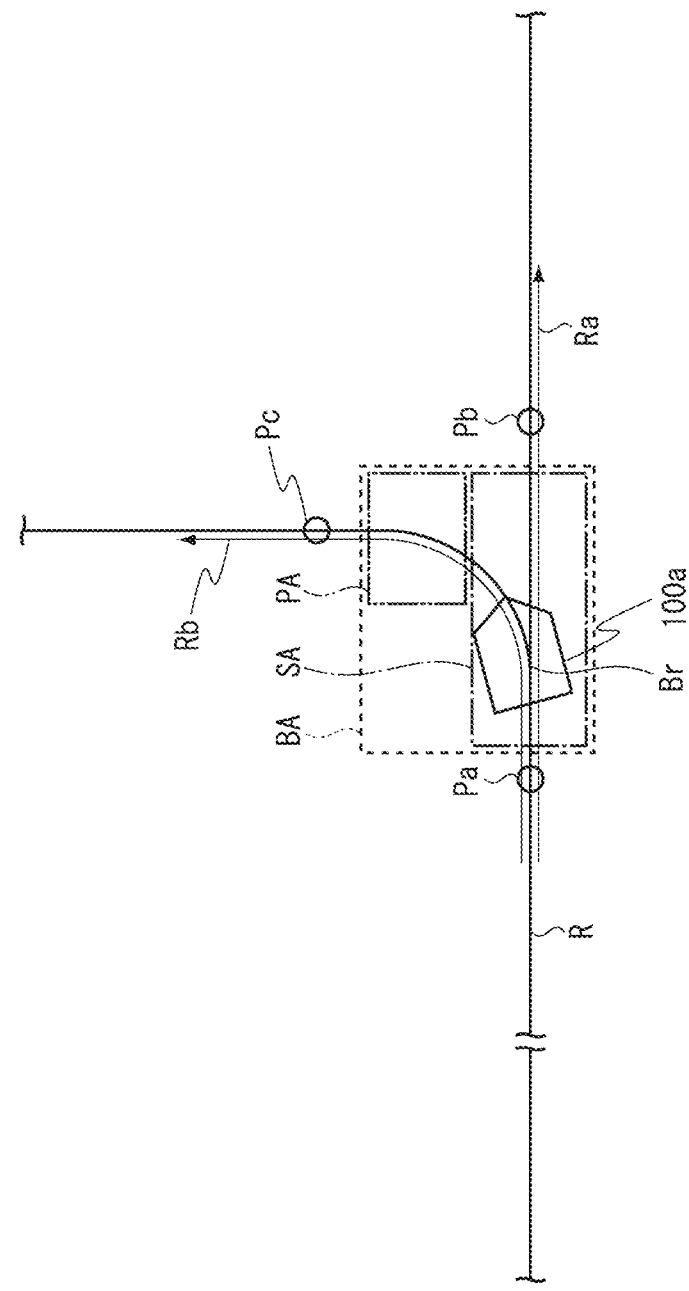
FIG. 8 is a diagram showing an example of the traveling vehicle entering the blocking area according to the first preferred embodiment of the present invention.
Figure 9:
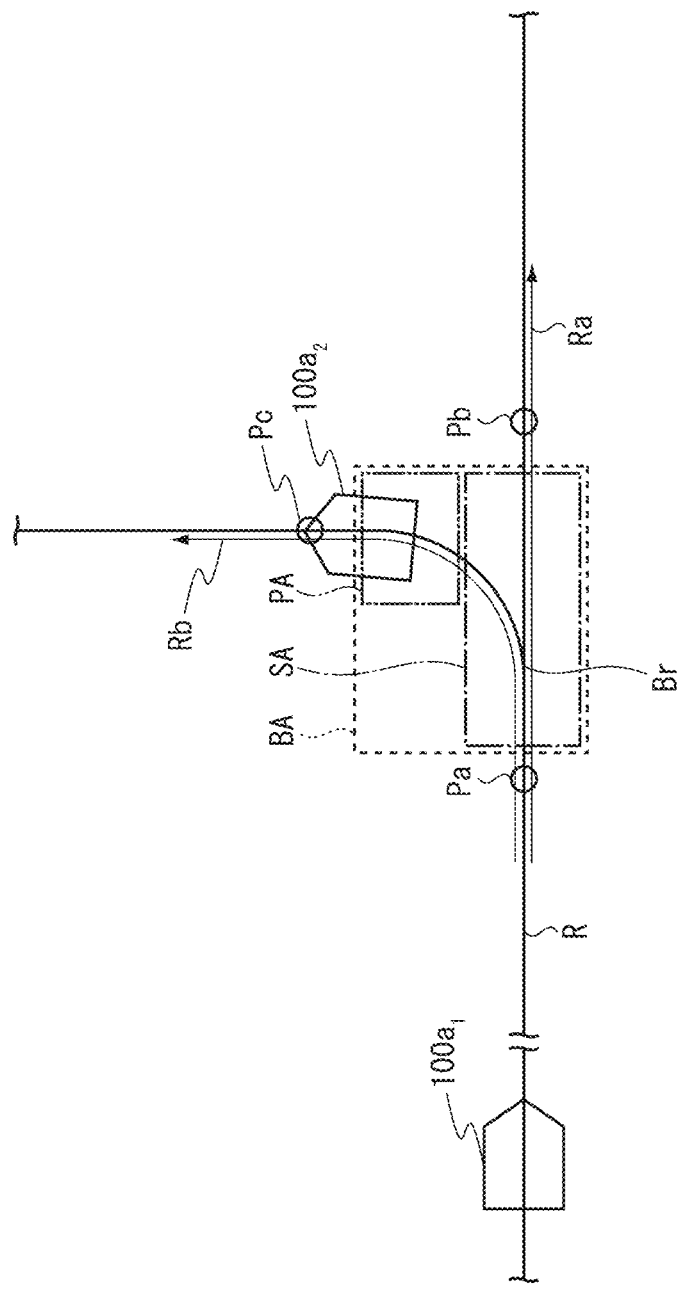
FIG. 9 is a diagram showing an example of the traveling vehicle entering the specific area according to the first preferred embodiment of the present invention.
Figure 10:
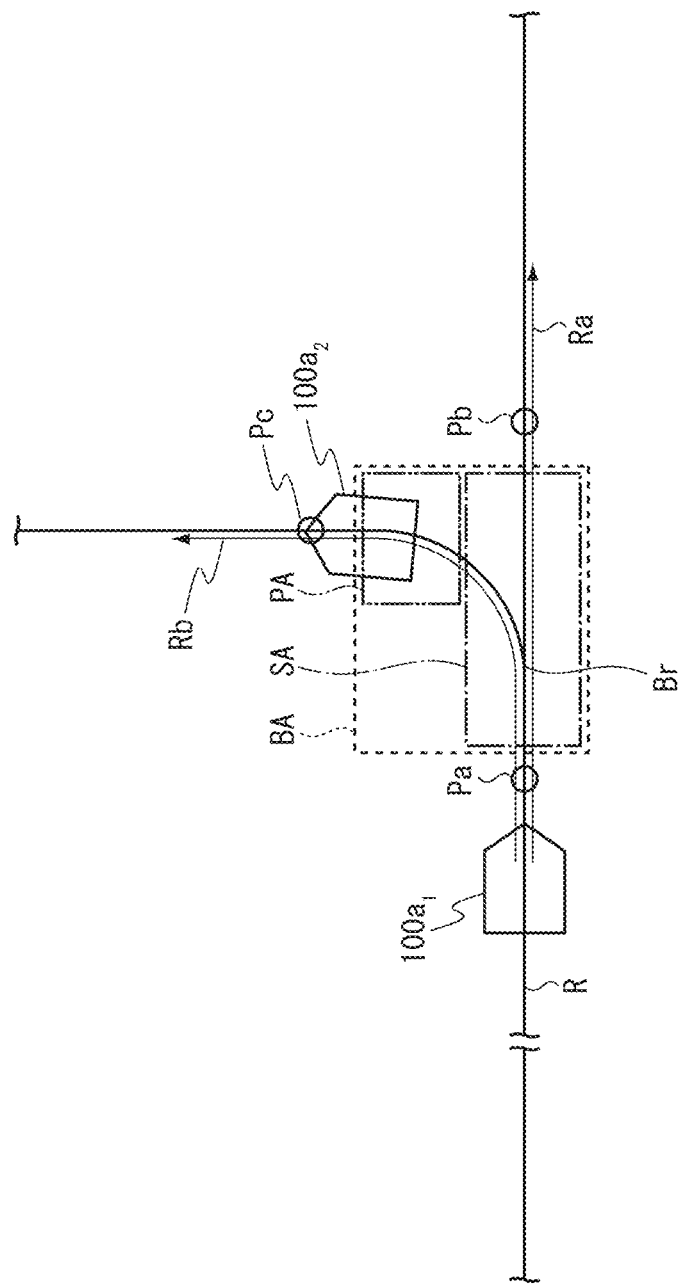
FIG. 10 is a diagram showing an example of the traveling vehicle entering the specific area according to the first preferred embodiment of the present invention.
Figure 11:
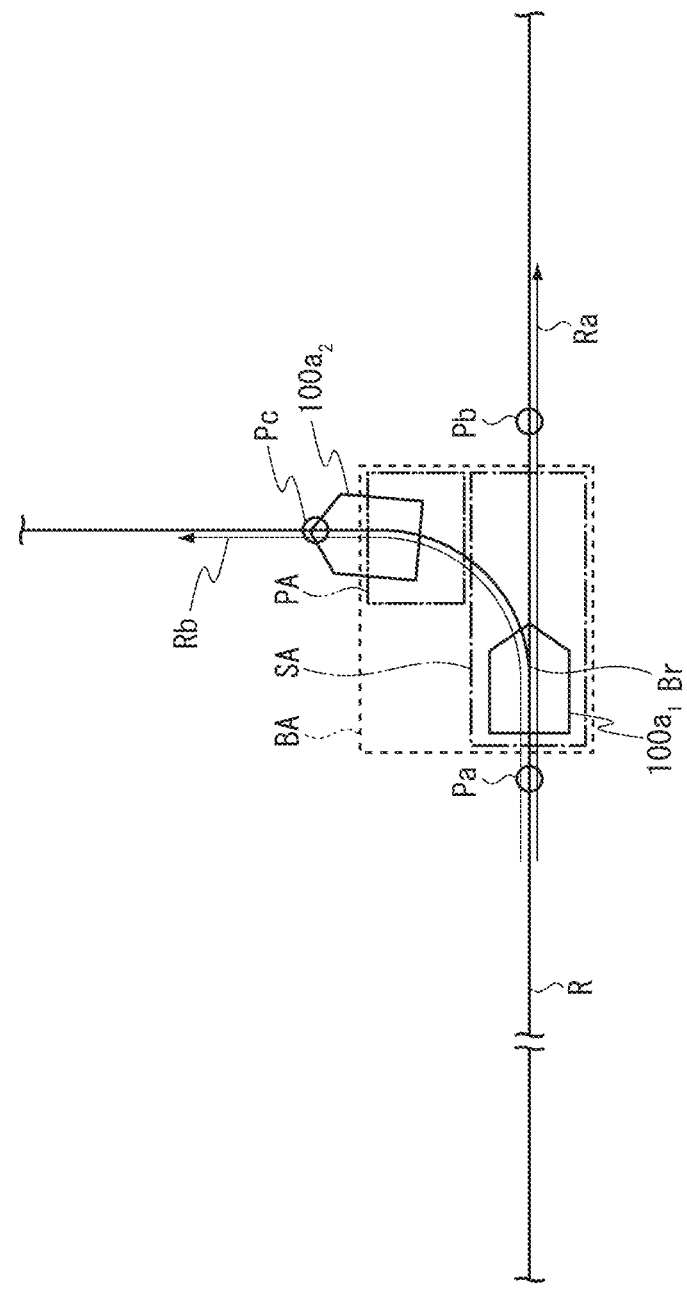
FIG. 11 is a diagram showing an example of the traveling vehicle entering the specific area according to the first preferred embodiment of the present invention.

FIG. 6 is a flowchart showing an example of the flow of processing performed by the traveling vehicle when entering a blocking area or a specific area according to the first preferred embodiment. The entry of the traveling vehicle 100*a* into the specific area SA described in FIG. 6 takes place as a result of a schedule of traveling in the direction of the traveling path Rb having been switched to a schedule of traveling in the direction of the traveling path Ra. FIG. 7 to FIG. 11 are used in the description of FIG. 6, where appropriate. FIG. 7 and FIG. 8 are diagrams showing an example of the traveling vehicle entering the blocking area according to the first preferred embodiment. FIG. 9 to FIG. 11 are diagrams showing an example of the traveling vehicle entering the specific area according to the first preferred embodiment.

First, described is a case where a traveling vehicle 100*a* traveling at an upstream side location away by certain distances or more from the blocking area BA and the point Pa transmits a passage request for the blocking area BA in a situation where no other traveling vehicle 100*a* is present in the blocking area BA (see FIG. 7). For the sake of simplicity in description, the situation is such that there is no other traveling vehicle 100*a* in the blocking area BA, however, in detail, the situation includes that there is no other traveling vehicle 100*a* that is scheduled to enter the blocking area BA. As shown in FIG. 6, the communicator 112 transmits to the controller 200 a passage request for the blocking area BA (Step S201). Specifically, the traveling controller 111 generates state information including the identification information of the blocking area BA as the passage request. The communicator 112 then transmits the state information generated by the traveling controller 111 to the controller 200.

The traveling controller 111 determines whether a passage permission for the blocking area BA has been received (Step S202). Specifically, the traveling controller 111 determines whether the communicator 112 has received a passage permission for the blocking area BA from the controller 200. At this time, if a passage permission for the blocking area BA has been received (Step S202: YES), the traveling controller 111 causes the traveling vehicle to enter the blocking area BA based on a travel segment (Step S203). Specifically, if the communicator 112 has received a passage permission for the blocking area BA from the controller 200, the traveling controller 111 causes the traveling vehicle to enter the blocking area BA in order to travel based on a travel segment between the point Pa and the point Pc (see FIG. 8).

Next, described is a case where a traveling vehicle 100a1 traveling at an upstream side location away by certain distances or more from the blocking area BA and the point Pa transmits a passage request for the blocking area BA in a situation where another traveling vehicle 100a2 is present in the predetermined area PA (see FIG. 9). As shown in FIG. 6, the communicator 112 transmits to the controller 200 a passage request for the blocking area BA (Step S201). Specifically, the traveling controller 111 generates state information including the identification information of the blocking area BA as the passage request. The communicator 112 then transmits the state information generated by the traveling controller 111 to the controller 200.

The traveling controller 111 determines whether a passage permission for the blocking area BA has been received (Step S202). Specifically, the traveling controller 111 determines whether the communicator 112 has received a passage permission for the blocking area BA from the controller 200. At this time, if a passage permission for the blocking area BA has not been received (Step S202: NO), the traveling controller 111 determines whether branch information has been acquired (Step S204). Specifically, if the communicator 112 has not received a passage permission for the blocking area BA from the controller 200, the traveling controller 111 determines whether branch information has been acquired from the point Pa. At this time, if branch information has not been acquired from the point Pa (Step S204: NO), the traveling controller 111 again executes the process of Step S201.

On the other hand, if branch information has been acquired from the point Pa (Step S204: YES), the traveling controller 111 determines whether a predetermined period of time has elapsed since the traveling vehicle stopped in the vicinity of the point Pa (since branch information has been acquired from the point Pa) (Step S205). Here, acquisition of branch information from the point Pa is realized when the traveling vehicle 100a1 has traveled to the vicinity of the point Pa (see FIG. 10). This means that the traveling vehicle 100a1 has traveled to the vicinity of the point Pa (stopped in the vicinity of the point Pa) without having obtained a passage permission for the blocking area BA. Now, if branch information has been acquired from the point Pa, the traveling controller 111 determines whether a predetermined period of time has elapsed since the traveling vehicle stopped in the vicinity of the point Pa (since branch information has been acquired from the point Pa) in order to switch the traveling route from the traveling path Rb to the traveling path Ra. The predetermined period of time may be set to such an extent that congestion of a plurality of traveling vehicles 100a does not occur at a location short of the blocking area BA. If the predetermined period of time has not elapsed (Step S205: NO), the process of Step S201 is executed again.

If the traveling controller 111 determines the predetermined period of time as having elapsed since the traveling vehicle stopped in the vicinity of the point Pa (since branch information has been acquired from the point Pa) (Step S205: YES), the communicator 112 transmits a passage request for the specific area SA to the controller 200 (Step S206). Specifically, the traveling controller 111 generates state information including the identification information of the specific area SA as the passage request. The communicator 112 then transmits the state information generated by the traveling controller 111 to the controller 200.

The traveling controller 111 determines whether a passage permission for the specific area SA has been received (Step S207). Specifically, the traveling controller 111 determines whether the communicator 112 has received a passage permission for the specific area SA from the controller 200. At this time, if a passage permission for the specific area SA has not been received (Step S207: NO), the traveling controller 111 again executes the process of Step S206. On the other hand, if a passage permission for the specific area SA has been received (Step S207: YES), the traveling controller 111 causes the traveling vehicle to enter the specific area SA based on a travel segment (Step S208). Specifically, if the communicator 112 has received a passage permission for the specific area SA from the controller 200, the traveling controller 111 causes the traveling vehicle to enter the specific area SA in order to travel based on the travel segment between the point Pa and the point Pb (see FIG. 11).

Figure 12:
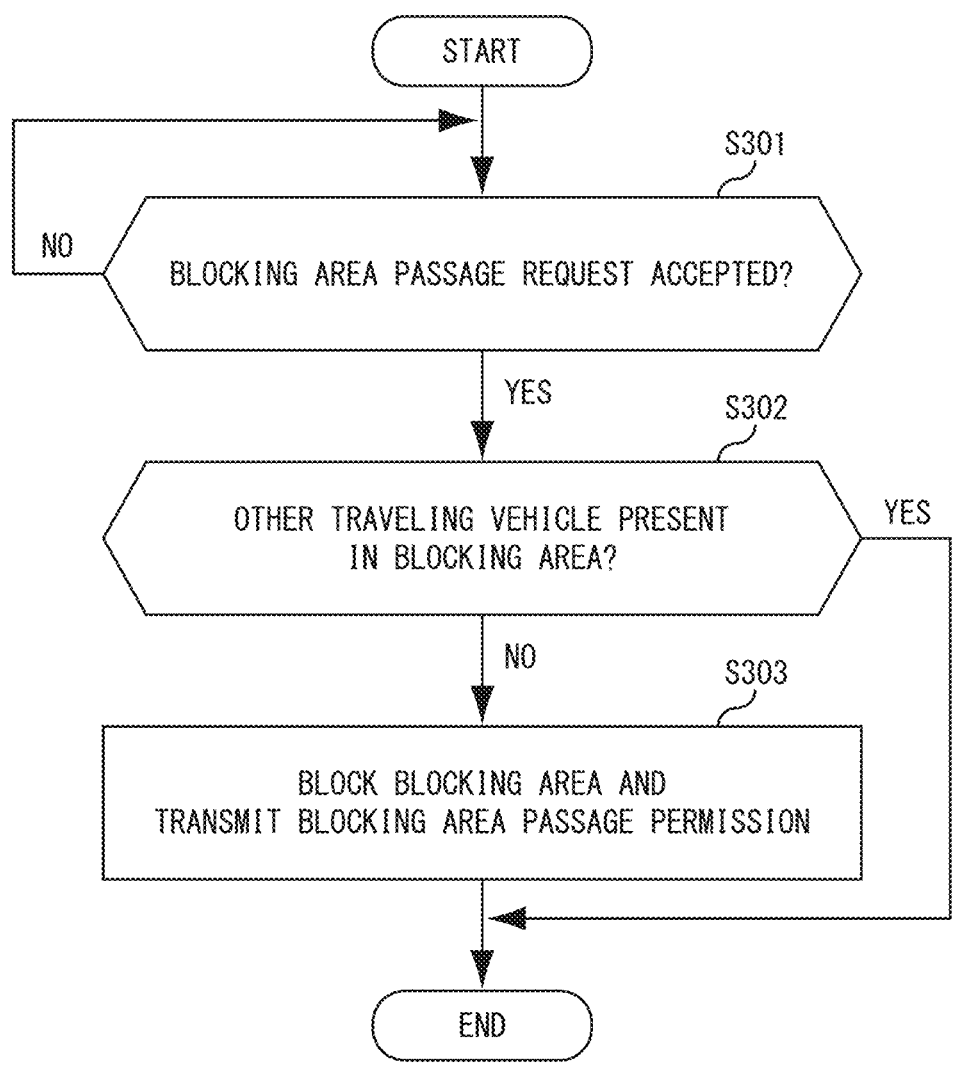
FIG. 12 is a flowchart showing an example of the flow of processing performed by the controller to execute a passage permission setting process for the blocking area according to the first preferred embodiment of the present invention.

FIG. 12 is a flowchart showing an example of the flow of processing performed by the controller to execute a passage permission setting process for the blocking area according to the first preferred embodiment. The branch controller 220 determines whether a passage request for the blocking area BA has been accepted (Step S301). Specifically, the branch controller 220 checks the state information received by the communicator 230 and stored in the memory storage 240, to determine whether a passage request (state information) for the blocking area BA is present. At this time, if a passage request for the blocking area BA has not been accepted (Step S301: NO), the branch controller 220 again executes the process of Step S301. That is to say, the branch controller 220 enters a state of waiting to accept a passage request for the blocking area BA.

On the other hand, if a passage request for the blocking area BA has been accepted (Step S301: YES) the branch controller 220 determines whether another traveling vehicle 100a is present in the blocking area BA (Step S302). Specifically, if a passage request for the blocking area BA is stored in the memory storage 240, the branch controller 220 generates (updates) blocking information based on the state information stored in the memory storage 240. Then, in response to the passage request included in the blocking information, the branch controller 220 determines whether another traveling vehicle 100a is present in the concerned blocking area BA, from the information indicating whether or not blocking is being enforced in the concerned blocking area BA. The branch controller 220 may check the presence or absence of another traveling vehicle 100a in the concerned blocking area BA, from the current location of each traveling vehicle 100a, to determine whether another traveling vehicle 100a is present in the concerned blocking area BA.

If another traveling vehicle 100a is determined as being present in the blocking area BA (Step S302: YES), the branch controller 220 ends the process without granting a passage permission. If it is determined that there is no other traveling vehicle 100a present in the blocking area BA (Step S302: NO), the branch controller 220 enforces blocking in the blocking area BA and instructs the communicator 230 to transmit a passage permission for the blocking area BA to the traveling vehicle 100a (Step S303). Specifically, if the concerned blocking area BA is in the state of not being blocking-enforced, the branch controller 220 switches the concerned blocking area BA to the state of being blocking-enforced. If no other traveling vehicle 100a is present in the concerned blocking area BA based on the current location of each traveling vehicle 100a, the branch controller 220 may switch the concerned blocking area BA to the state of being blocking-enforced. Then, the communicator 230 transmits a passage permission for the concerned blocking area BA to the traveling vehicle 100a that has transmitted the passage request. In a case where the traveling vehicle 100a that has been granted a passage permission has made multiple passage request transmissions and hence multiple passage requests for the blocking area BA associated with the concerned traveling vehicle 100a are present in the memory storage 240, the branch controller 220 removes all of the passage requests.

Figure 13:
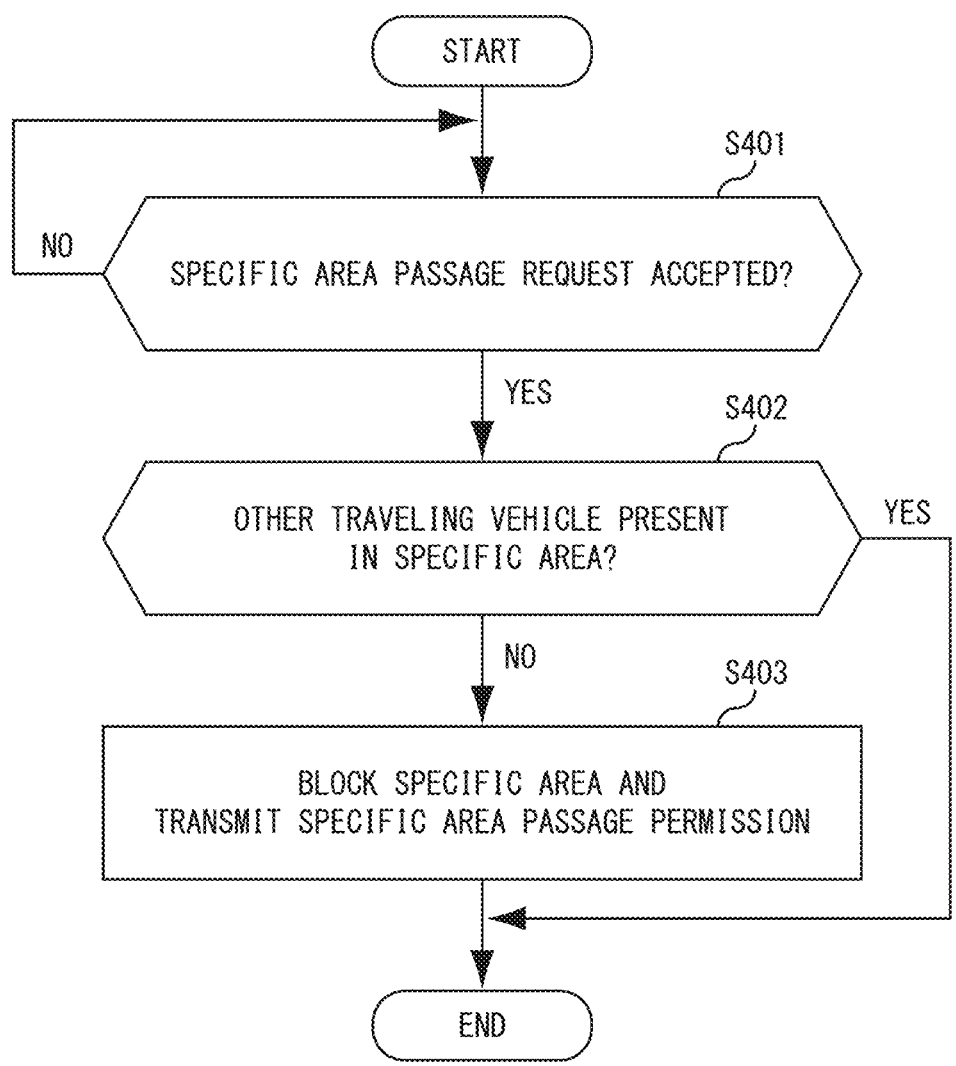
FIG. 13 is a flowchart showing an example of the flow of processing performed by the controller to execute a passage permission setting process for the specific area according to the first preferred embodiment of the present invention.

FIG. 13 is a flowchart showing an example of the flow of processing performed by the controller to execute a passage permission setting process for the specific area according to the first preferred embodiment. The branch controller 220 determines whether a passage request for the specific area SA has been accepted (Step S401). Specifically, the branch controller 220 checks the state information received by the communicator 230 and stored in the memory storage 240, to determine whether a passage request (state information) for the specific area SA is present. At this time, if a passage request for the specific area SA has not been accepted (Step S401: NO), the branch controller 220 again executes the process of Step S401. That is to say, the branch controller 220 enters the state of waiting to accept a passage request for the specific area SA.

On the other hand, if a passage request for the specific area SA has been accepted (Step S401: YES) the branch controller 220 determines whether another traveling vehicle 100a is present in the specific area SA (Step S402). Specifically, if a passage request for the specific area SA is stored in the memory storage 240, the branch controller 220 generates (updates) blocking information based on the state information stored in the memory storage 240. Then, in response to the passage request included in the blocking information, the branch controller 220 determines whether another traveling vehicle 100a is present in the concerned specific area SA, from the information indicating whether or not blocking is being enforced in the concerned specific area SA. The branch controller 220 may check the presence or absence of another traveling vehicle 100a in the concerned specific area SA, from the current location of each traveling vehicle 100a, to determine whether another traveling vehicle 100a is present in the concerned specific area SA.

If another traveling vehicle 100a is determined as being present in the specific area SA (Step S402: YES), the branch controller 220 ends the process without granting a passage permission. If it is determined that there is no other traveling vehicle 100a present in the specific area SA (Step S402: NO), the branch controller 220 enforces blocking in the specific area SA and instructs the communicator 230 to transmit a passage permission for the specific area SA to the traveling vehicle 100a (Step S403). Specifically, if the concerned specific area SA is in the state of not being blocking-enforced, the branch controller 220 switches the concerned specific area SA to the state of being blocking-enforced. If no other traveling vehicle 100a is present in the concerned specific area SA based on the current location of each traveling vehicle 100a, the branch controller 220 may switch the concerned specific area SA to the state of being blocking-enforced. Then, the communicator 230 transmits a passage permission for the concerned specific area SA to the traveling vehicle 100a that has transmitted the passage request. In a case where the traveling vehicle 100a that has been granted a passage permission has made multiple passage request transmissions and hence multiple passage requests for the specific area SA associated with the concerned traveling vehicle 100a are present in the memory storage 240, the branch controller 220 removes all of the passage requests.

Figure 14:
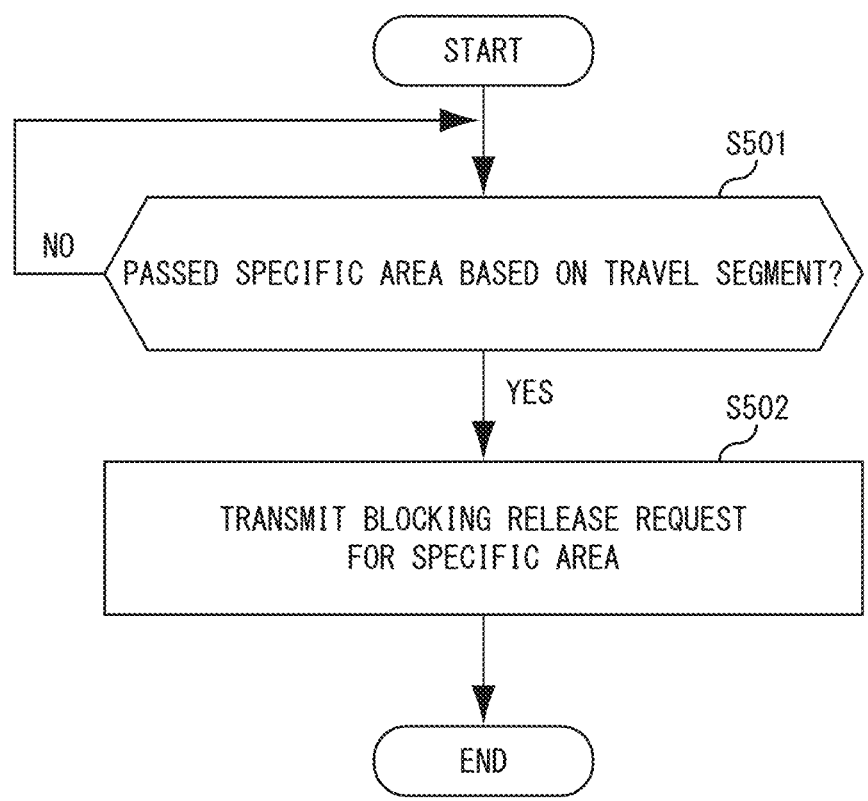
FIG. 14 is a flowchart showing an example of the flow of processing performed by the traveling vehicle when passing through the specific area according to the first preferred embodiment of the present invention.
Figure 15:
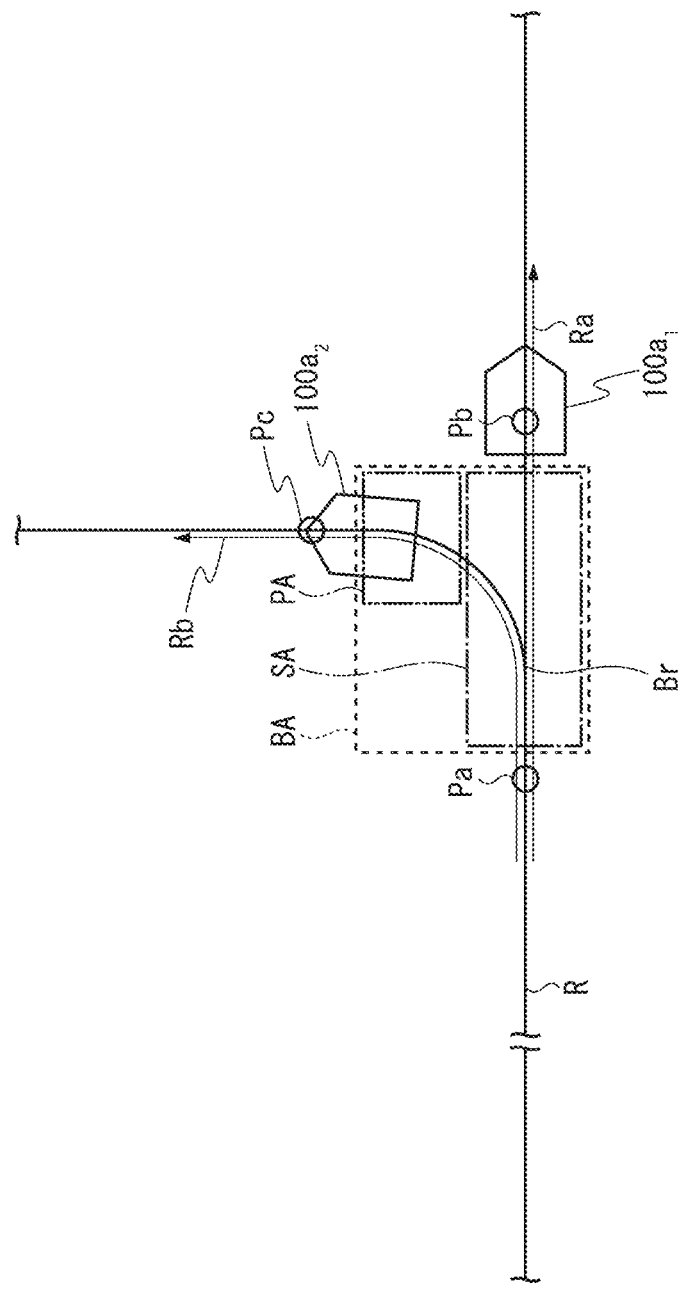
FIG. 15 is a diagram showing an example of the traveling vehicle passing through the specific area according to the first preferred embodiment of the present invention.

FIG. 14 is a flowchart showing an example of the flow of processing performed by the traveling vehicle when passing through the specific area according to the first preferred embodiment. In the description of FIG. 14, FIG. 15 is used where appropriate. FIG. 15 is a diagram showing an example of the traveling vehicle passing through the specific area according to the first preferred embodiment.

As shown in FIG. 14, the traveling controller 111 determines whether the specific area SA has been passed through by traveling based on a travel segment (Step S501). For example, the traveling vehicle 100a1 is traveling based on the travel segment between the point Pa and the point Pb (see FIG. 15). Specifically, the traveling controller 111 determines whether the specific area SA has been passed through, from the current location taking into consideration the traveled distance from the point Pa or from the current location obtained by detecting the location marker at the point Pb. At this time, if the specific area SA has not been passed through (Step S501: NO), the traveling controller 111 again executes the process of Step S501. Specifically, if the current location taking into consideration the traveled distance from the point Pa is within the specific area SA, or if the location marker at the point Pb has not been detected, the traveling controller 111 repeatedly executes the process of Step S501 until the specific area SA has been passed through.

On the other hand, if the specific area SA has been passed through (Step S501: YES), the traveling controller 111 instructs the communicator 112 to transmit to the controller 200 a blocking release request for the specific area SA that has been passed through (Step S502). Specifically, if the current location taking into consideration the traveled distance from the point Pa is outside the specific area SA (see FIG. 15), or if the specific area SA has been passed through as indicated upon detection of the location marker at the point Pb (see FIG. 15), the traveling controller 111 generates a release request (state information) including the identification information that indicates the specific area SA that has been passed through. Then, the communicator 112 transmits to the controller 200 the state information including the blocking release request for the specific area SA that has been passed through. It should be noted that the traveling vehicle 100a1 may make multiple transmissions of the state information including the release request corresponding to the specific area SA that has been passed through.

Figure 16:
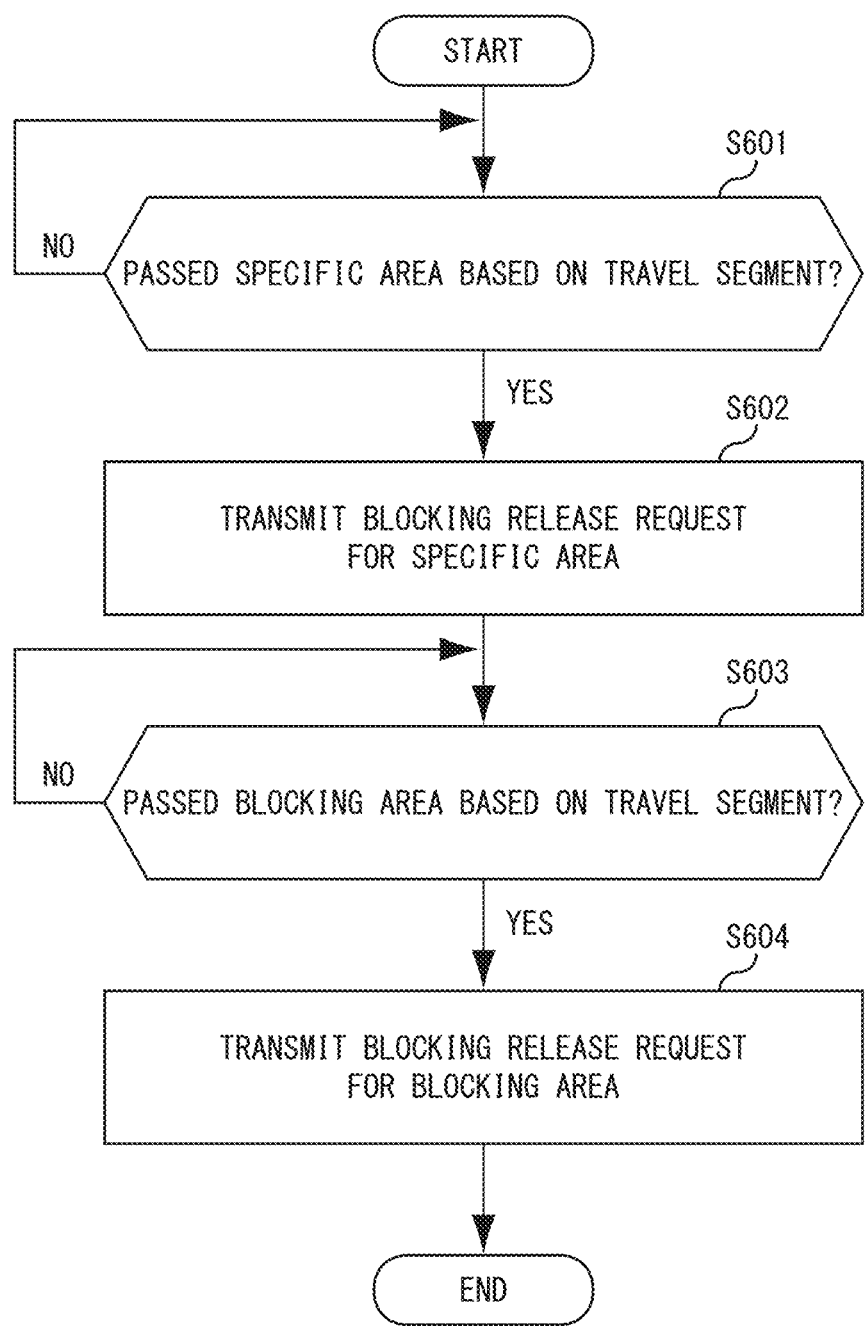
FIG. 16 is a flowchart showing an example of the flow of processing performed by the traveling vehicle when passing through the blocking area according to the first preferred embodiment of the present invention.
Figure 17:
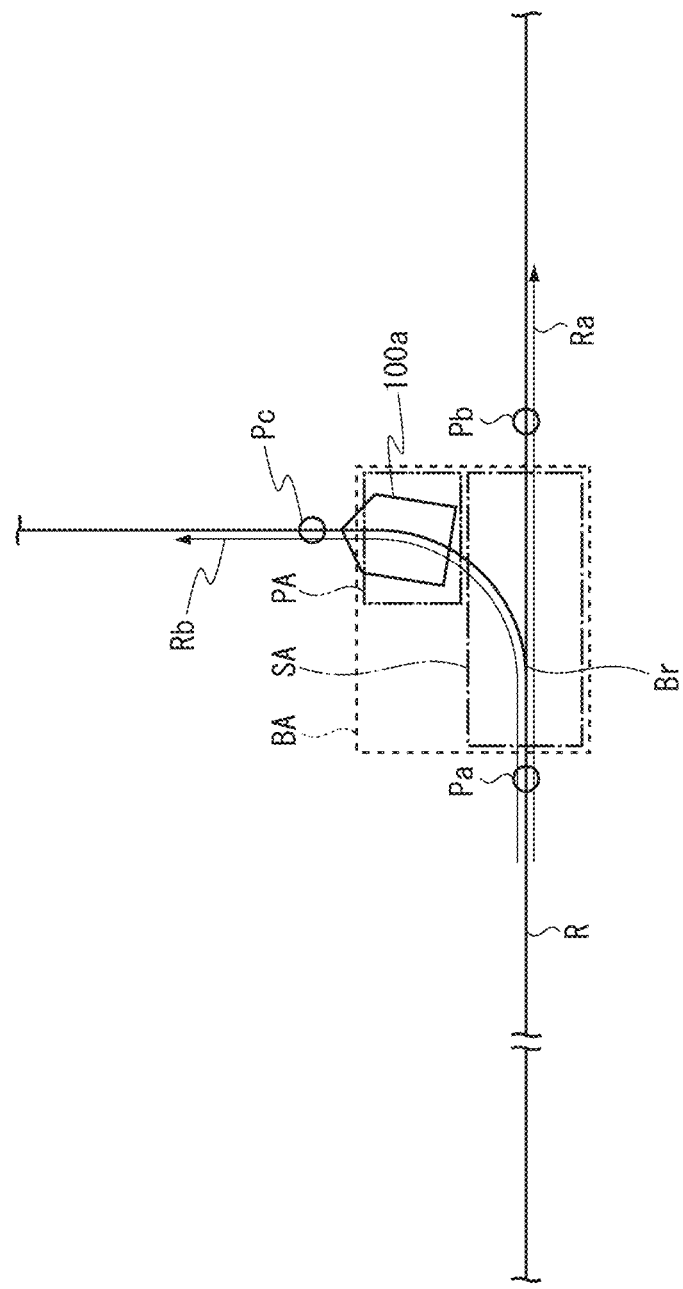
FIG. 17 is a diagram showing an example of the traveling vehicle passing through the blocking area according to the first preferred embodiment of the present invention.
Figure 18:
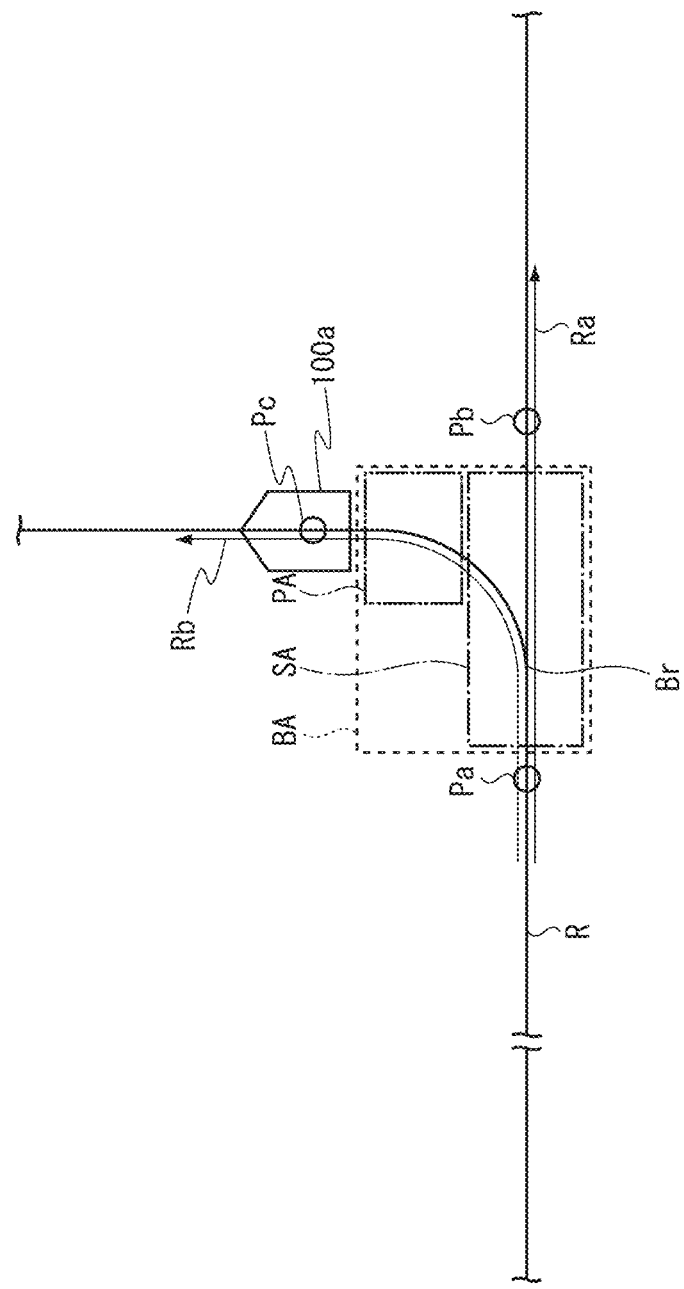
FIG. 18 is a diagram showing an example of the traveling vehicle passing through the blocking area according to the first preferred embodiment of the present invention.

FIG. 16 is a flowchart showing an example of the flow of processing performed by the traveling vehicle when passing through the blocking area according to the first preferred embodiment. In the description of FIG. 16, FIG. 17 and FIG. 18 are used where appropriate. FIG. 17 and FIG. 18 are diagrams showing an example of the traveling vehicle passing through the blocking area according to the first preferred embodiment.

As shown in FIG. 16, the traveling controller 111 determines whether the specific area SA has been passed through by traveling based on a travel segment (Step S601). For example, the traveling vehicle 100a that has acquired a passage permission for the blocking area BA is traveling based on the travel segment between the point Pa and the point Pc (see FIG. 17 and FIG. 18). Specifically, the traveling controller 111 determines whether the specific area SA has been passed through, from the current location taking into consideration the traveled distance from the point Pa. At this time, if the specific area SA has not been passed through (Step S601: NO), the traveling controller 111 again executes the process of Step S601. Specifically, if the current location taking into consideration the traveled distance from the point Pa is within the specific area SA, the traveling controller 111 repeatedly executes the process of Step S601 until the specific area SA has been passed through.

On the other hand, if the specific area SA has been passed through (Step S601: YES), the traveling controller 111 instructs the communicator 112 to transmit to the controller 200 a blocking release request for the specific area SA that has been passed through (Step S602). Specifically, if the current location taking into consideration the traveled distance from the point Pa is outside the specific area SA (see FIG. 17), the traveling controller 111 generates a release request (state information) including the identification information that indicates the specific area SA that has been passed through. Then, the communicator 112 transmits to the controller 200 the state information including the blocking release request for the specific area SA that has been passed through. It should be noted that the traveling vehicle 100*a* may make multiple transmissions of the state information including the release request corresponding to the specific area SA that has been passed through.

Subsequently, the traveling controller 111 determines whether the blocking area BA has been passed through by traveling based on a travel segment (Step S603). Specifically, the traveling controller 111 determines whether the blocking area BA has been passed through, from the current location taking into consideration the traveled distance from the point Pa or from the current location obtained by detecting the location marker at the point Pc. At this time, if the blocking area BA has not been passed through (Step S603: NO), the traveling controller 111 again executes the process of Step S603. Specifically, if the current location taking into consideration the traveled distance from the point Pa is within the blocking area BA, or if the location marker at the point Pc has not been detected, the traveling controller 111 repeatedly executes the process of Step S603 until the blocking area BA has been passed through.

On the other hand, if the blocking area BA has been passed through (Step S603: YES), the traveling controller 111 instructs the communicator 112 to transmit to the controller 200 a blocking release request for the blocking area BA that has been passed through (Step S604). Specifically, if the current location taking into consideration the traveled distance from the point Pa is outside the blocking area BA (see FIG. 18), or if the blocking area BA has been passed through as indicated upon detection of the location marker at the point Pc (see FIG. 18), the traveling controller 111 generates a release request (state information) including the identification information that indicates the blocking area BA that has been passed through. Then, the communicator 112 transmits to the controller 200 the state information including the blocking release request for the blocking area BA that has been passed through. It should be noted that the traveling vehicle 100*a* may make multiple transmissions of the state information including the release request corresponding to the blocking area BA that has been passed through.

Figure 19:
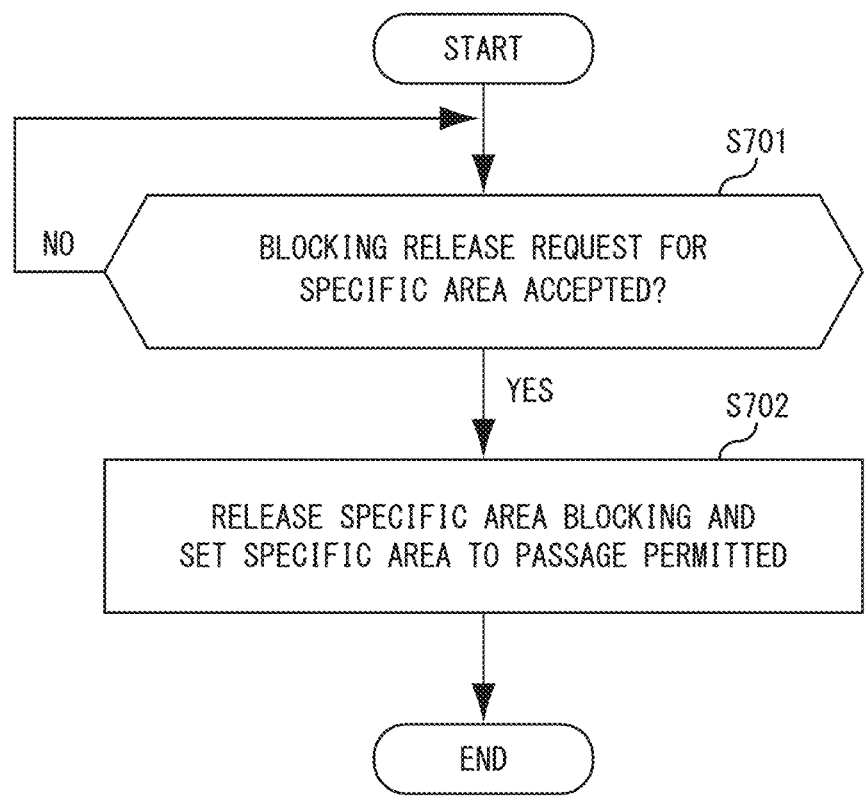
FIG. 19 is a flowchart showing an example of the flow of processing performed by the controller to execute a blocking release setting process for the specific area according to the first preferred embodiment of the present invention.

FIG. 19 is a flowchart showing an example of the flow of processing performed by the controller to execute a blocking release setting process for the specific area according to the first preferred embodiment. As shown in FIG. 19, the branch controller 220 determines whether a blocking release request for the specific area SA has been accepted (Step S701). Specifically, the branch controller 220 checks the state information received by the communicator 230 and stored in the memory storage 240, to determine whether a release request (state information) for the specific area SA is present. At this time, if a blocking release request (state information) for the specific area SA has not been accepted (Step S701: NO), the branch controller 220 again executes the process of Step S701. That is to say, the branch controller 220 enters the state of waiting to accept a blocking release request for the specific area SA.

On the other hand, if a blocking release request for the specific area SA has been accepted (Step S701: YES) the branch controller 220 releases the blocking of the specific area SA and sets the specific area SA to allow passage therethrough (Step S702). Specifically, if a release request for the specific area SA is stored in the memory storage 240, the branch controller 220 updates the blocking information of the specific area SA. For example, the branch controller 220 updates, of the blocking information, information indicating whether or not blocking is being enforced to information indicating that blocking is not being enforced. It should be noted that the branch controller 220 may update the blocking information after having checked the current location of the traveling vehicle 100*a* that issued the release request. In a case where the same traveling vehicle 100*a* has made multiple transmissions of a release request for the specific area SA and hence multiple release requests for the concerned specific area SA are present in the memory storage 240, the branch controller 220 removes all of the release requests.

Figure 20:
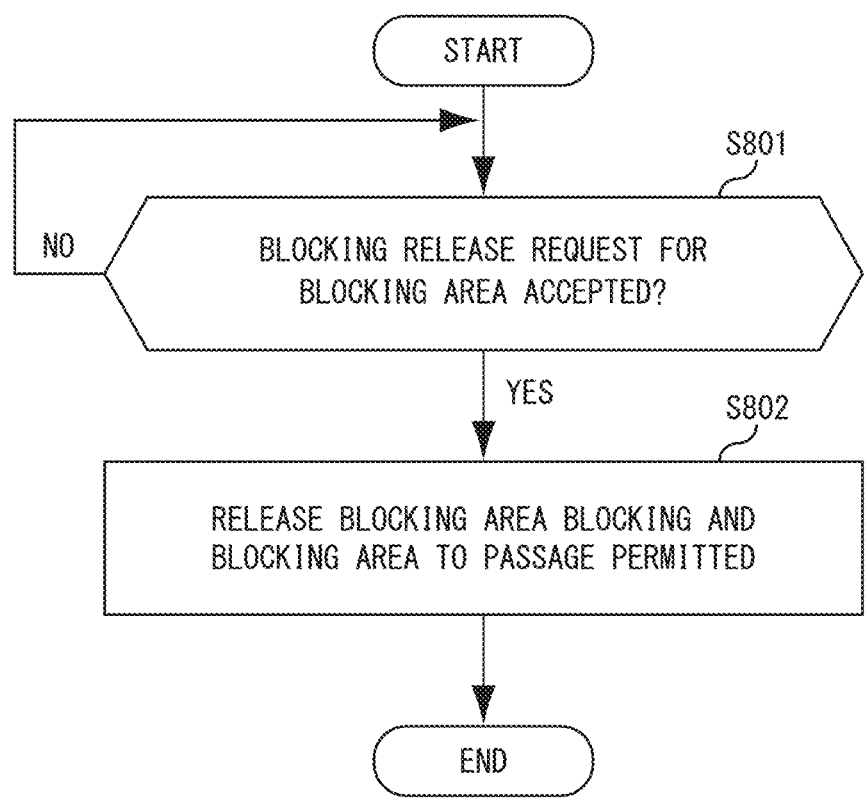
FIG. 20 is a flowchart showing an example of the flow of processing performed by the controller to execute a blocking release setting process for the blocking area according to the first preferred embodiment of the present invention.

FIG. 20 is a flowchart showing an example of the flow of processing performed by the controller to execute a blocking release setting process for the blocking area according to the first preferred embodiment. As shown in FIG. 20, the branch controller 220 determines whether a blocking release request for the blocking area BA has been accepted (Step S801). Specifically, the branch controller 220 checks the state information received by the communicator 230 and stored in the memory storage 240, to determine whether a release request (state information) for the blocking area BA is present. At this time, if a blocking release request (state information) for the blocking area BA has not been accepted (Step S801: NO), the branch controller 220 again executes the process of Step S801. That is to say, the branch controller 220 enters the state of waiting to accept a blocking release request for the blocking area BA.

On the other hand, if a blocking release request for the blocking area BA has been accepted (Step S801: YES) the branch controller 220 releases the blocking of the blocking area BA and sets the blocking area BA to allow passage therethrough (Step S802). Specifically, if a release request for the blocking area BA is stored in the memory storage 240, the branch controller 220 updates the blocking information of the blocking area BA. For example, the branch controller 220 updates, of the blocking information, information indicating whether or not blocking is being enforced to information indicating that blocking is not being enforced. It should be noted that the branch controller 220 may update the blocking information after having checked the current location of the traveling vehicle 100*a* that issued the release request. In a case where the same traveling vehicle 100a has made multiple transmissions of a release request for the blocking area BA and hence multiple release requests for the concerned blocking area BA are present in the memory storage 240, the branch controller 220 removes all of the release requests.

In the traveling vehicle system SYS, regardless of whether or not blocking is being enforced in the blocking area BA, a passage permission for the specific area SA is granted to the traveling vehicle 100a that issued a passage request for the specific area SA if no other traveling vehicle 100a is present in the specific area SA, and thus the traveling vehicles 100a can efficiently pass through the branching portion Br. In the traveling vehicle system SYS, blocking of the specific area SA is released regardless of whether or not blocking is being enforced in the blocking area BA, and thus the traveling vehicles 100a can efficiently pass through the branching portion Br. In the traveling vehicle system SYS, the traveling vehicle 100a that has acquired branch information without having obtained a passage permission for the blocking area BA issues a passage request for the specific area SA, and it is thus possible to reduce or prevent congestion of a plurality of traveling vehicles 100a at a location short of the blocking area BA.

Second Preferred Embodiment

In a second preferred embodiment, configurations similar to those in the first preferred embodiment are assigned with the same reference signs and descriptions thereof may be omitted or simplified. In the second preferred embodiment, the traveling vehicles 100 are each referred to as "traveling vehicle 100b" unless they are each distinguished and are referred to as "traveling vehicle 100b1", "traveling vehicle 100b2", and so on when they are each distinguished.

Figure 21:
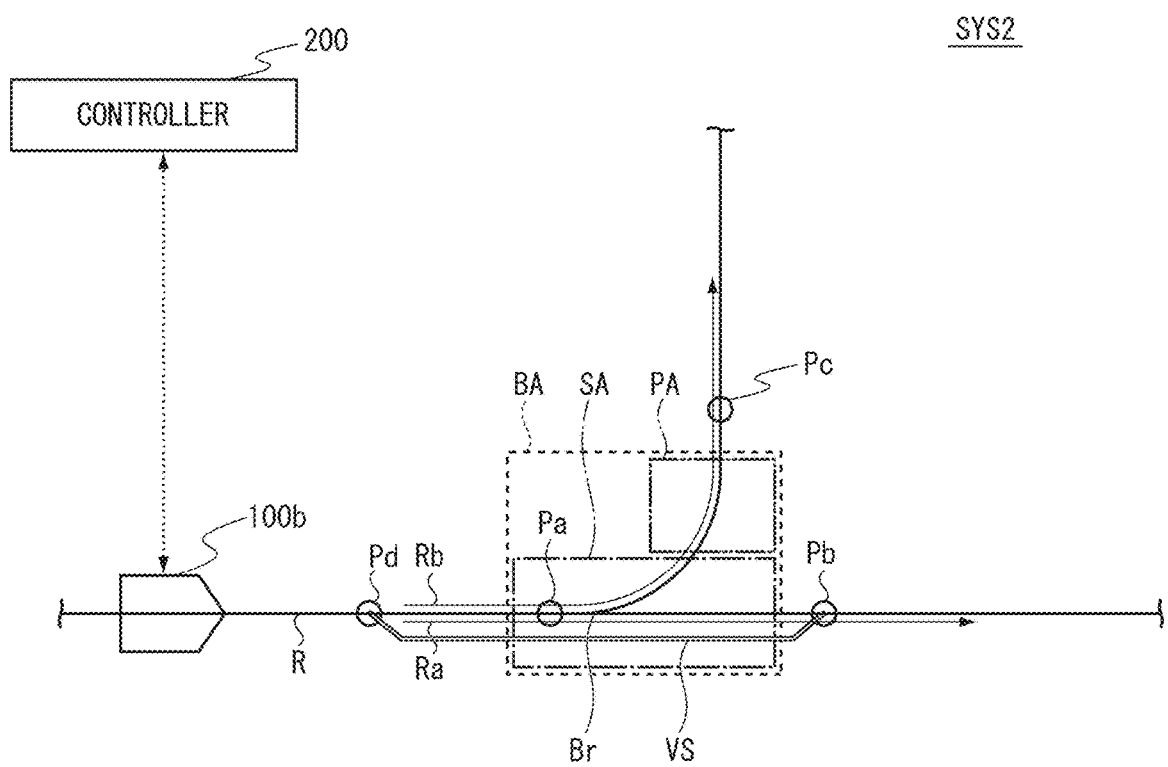
FIG. 21 is a diagram showing an example of a traveling vehicle system according to a second preferred embodiment of the present invention.

FIG. 21 is a diagram showing an example of a traveling vehicle system according to the second preferred embodiment. In a traveling vehicle system SYS2, the description takes a case as an example where the distance between the point Pa and the branching portion Br is reduced for convenience of point installation. The range (size) of the blocking area BA is preliminarily determined from the viewpoint of preventing collision of traveling vehicles 100b. As a result, in the traveling vehicle system SYS2, the point Pa is included within the blocking area BA. In the traveling vehicle system SYS, the point Pa has been described as a point that plays a role of a branching point and a permission-standby point. As described above, the permission-standby point is a point at which the traveling vehicle 100b that has not obtained a passage permission stops. When the point Pa is included within the blocking area BA, traveling to the permission-standby point is not possible unless entry to the blocking area BA is allowed. Therefore, in the traveling vehicle system SYS2, of a plurality of points provided on the traveling path R outside the blocking area BA, a point Pd located short of the point Pa and closer to the point Pa serves as a permission-standby point in place of the point Pa.

As with the first preferred embodiment, the traveling vehicle 100b travels based on a travel segment between points. Therefore, in the case where the point Pd serves as a permission-standby point, the travel segment on the downstream side including the point Pd is located between the point Pd and the point Pa. That is to say, in the case where the point Pa is present within the blocking area BA, it is difficult for the traveling vehicle 100b to switch its traveling route from the traveling path Rb to the traveling path Ra. When switching a traveling route is difficult at a location short of the blocking area BA, congestion of a plurality of traveling vehicles 100b can occur at a location short of the blocking area BA. Therefore, the traveling vehicle system SYS2 is of a configuration in which the point Pd can provide branch information to the traveling vehicle 100b, and the point Pa is not employed as a travel segment point of the specific area SA. In the second preferred embodiment, the segment between the point Pd and the point Pb is referred to as "virtual segment VS". That is to say, the virtual segment VS refers to a segment (virtual segment) from the point Pd to the point Pb. The traveling vehicle 100b ignores the point Pa when traveling on the virtual segment VS. It should be noted that the point Pa corresponds to a "first point", and the point Pd corresponds to a "second point".

Figure 22:
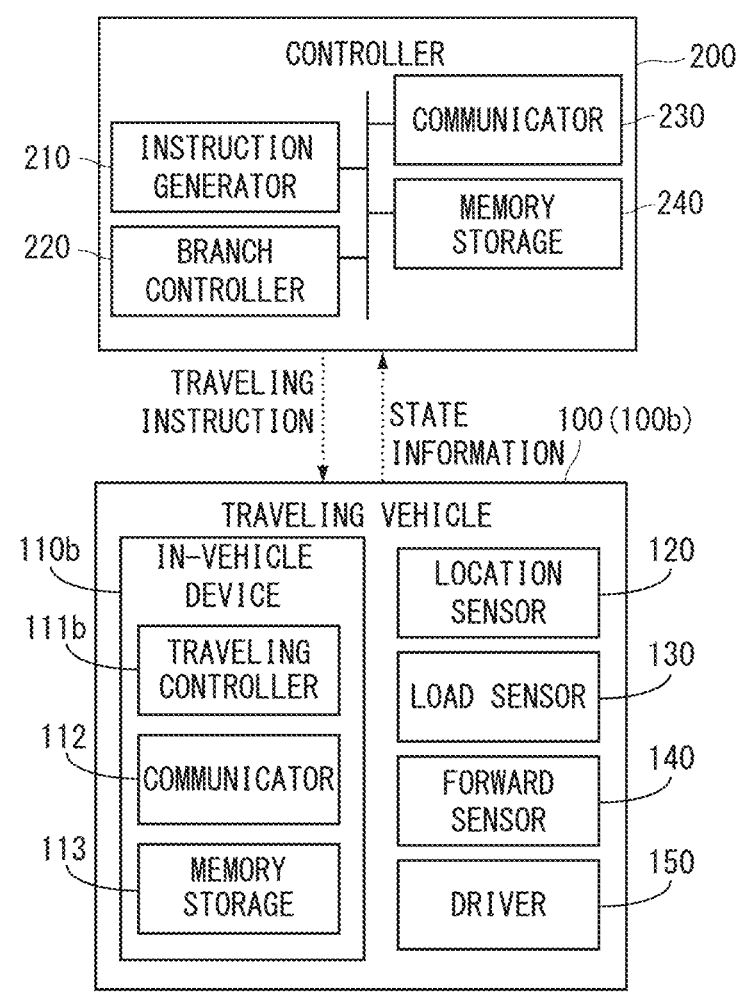
FIG. 22 is a block diagram showing a configuration example of the traveling vehicle and a controller according to the second preferred embodiment of the present invention.

FIG. 22 is a block diagram showing a configuration example of the traveling vehicle and the controller according to the second preferred embodiment. The traveling vehicle 100b has the in-vehicle device 110b, the location sensor 120, the load sensor 130, the forward sensor 140, and the driver 150. The in-vehicle device 110b has a traveling controller 111b, the communicator 112, and the memory storage 113.

If branch information is acquired in a situation where a passage permission for the blocking area BA or the specific area SA has not been acquired, the traveling controller 111b instructs the communicator 112 to transmit to the controller 200 a passage request for the specific area SA. Specifically, the traveling vehicle 100b travels to the vicinity of the point Pd without obtaining a passage permission for the blocking area BA or the specific area SA. At this time, the traveling controller 111b acquires branch information from the point Pd. The traveling vehicle 100b stops in the vicinity of the point Pd and waits for a permission to be granted for the passage request. When a predetermined period of time has elapsed since the branch information has been acquired from the point Pd, the traveling controller 111b instructs the communicator 112 to transmit to the controller 200 a passage request for the specific area SA. If the traveling vehicle 100b initially transmitted to the controller 200 a passage request for the specific area SA, that is, if it is initially scheduled to travel in the direction of the traveling path Ra, the traveling vehicle 100b does not wait for the predetermined period of time to elapse. Subsequently, if the communicator 112 has received a passage permission for the specific area SA from the controller 200, the traveling controller 111 causes the traveling vehicle to travel based on the virtual segment VS between the point Pd and the point Pb and enter the specific area SA. If a passage request for the specific area SA is initially transmitted to the controller 200, the traveling vehicle 100b executes Step S101 and Step S102 described above, travels based on the virtual segment VS in Step S103 and enters the specific area SA. The virtual segment VS is, for example, created preliminarily and held in the traveling vehicle 100b or the controller 200. When a passage permission for the specific area SA is acquired, the traveling vehicle 100b fetches the virtual segment VS held in itself or acquires the virtual segment VS from the controller 200, to travel based on the virtual segment VS.

The controller 200 has the instruction generator 210, the branch controller 220, the communicator 230, and the memory storage 240. Functions of the controller 200 are the same as those of the controller 200 according to the first preferred embodiment. As described above, the controller 200 may hold the virtual segment VS.

Figure 23:
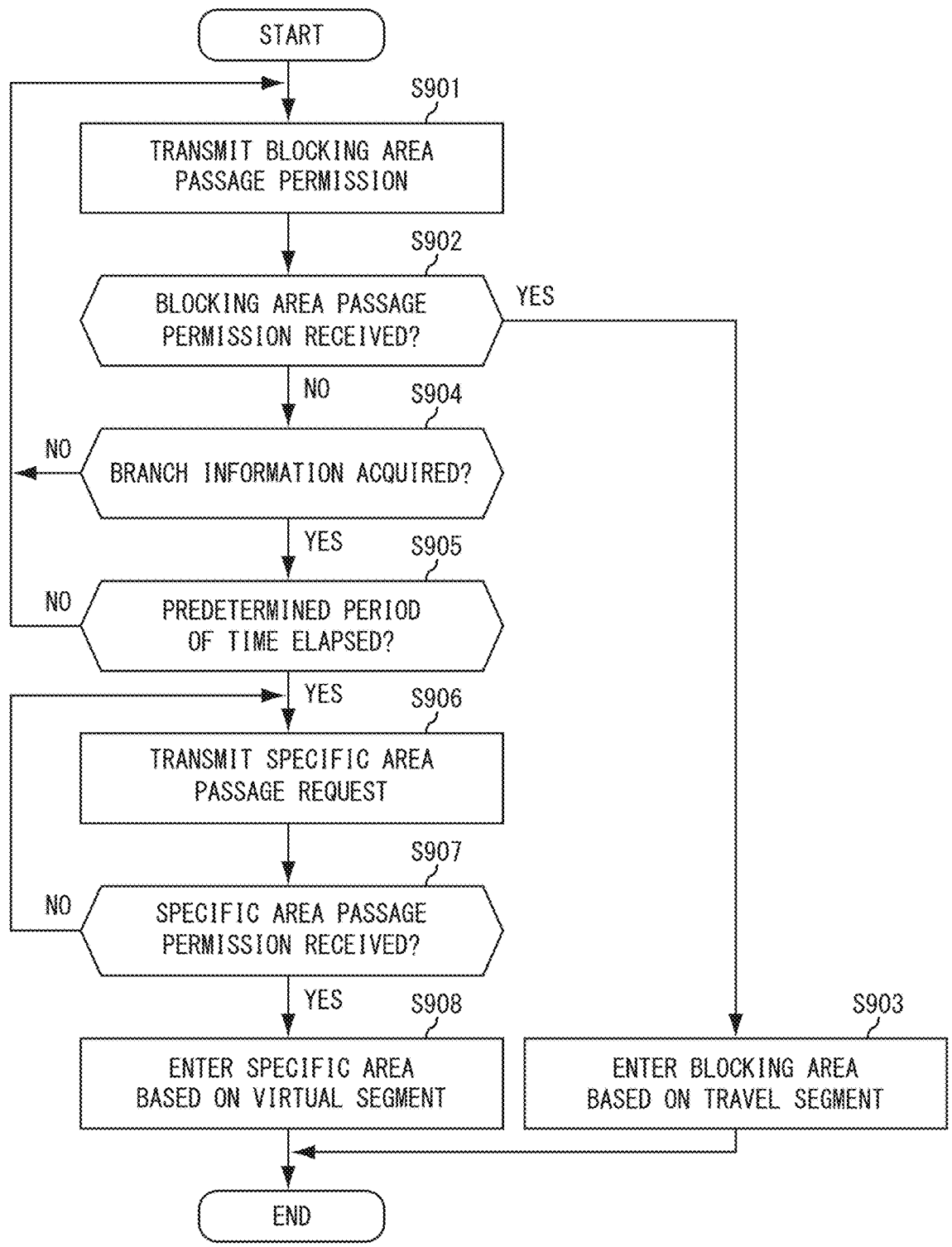
FIG. 23 is a flowchart showing an example of the flow of processing performed by the traveling vehicle when entering a blocking area or a specific area according to the second preferred embodiment of the present invention.
Figure 24:
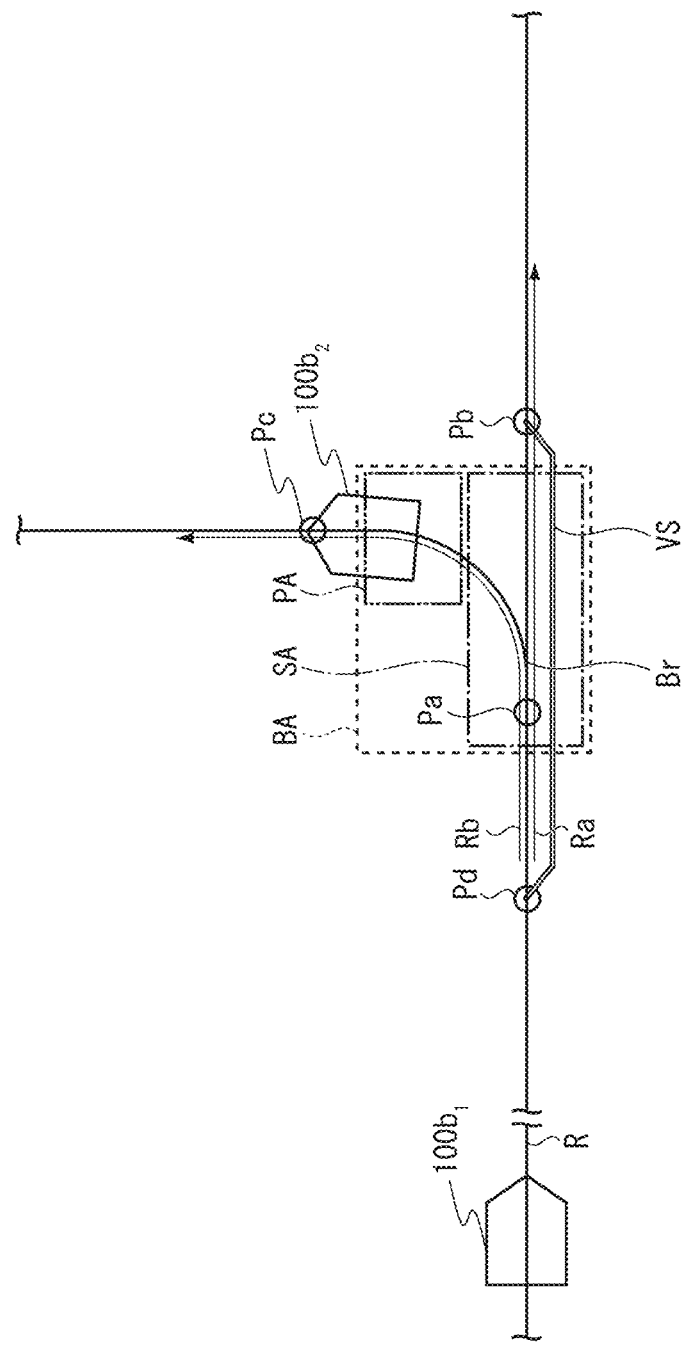
FIG. 24 is a diagram showing an example of the traveling vehicle entering the specific area according to the second preferred embodiment of the present invention.
Figure 25:
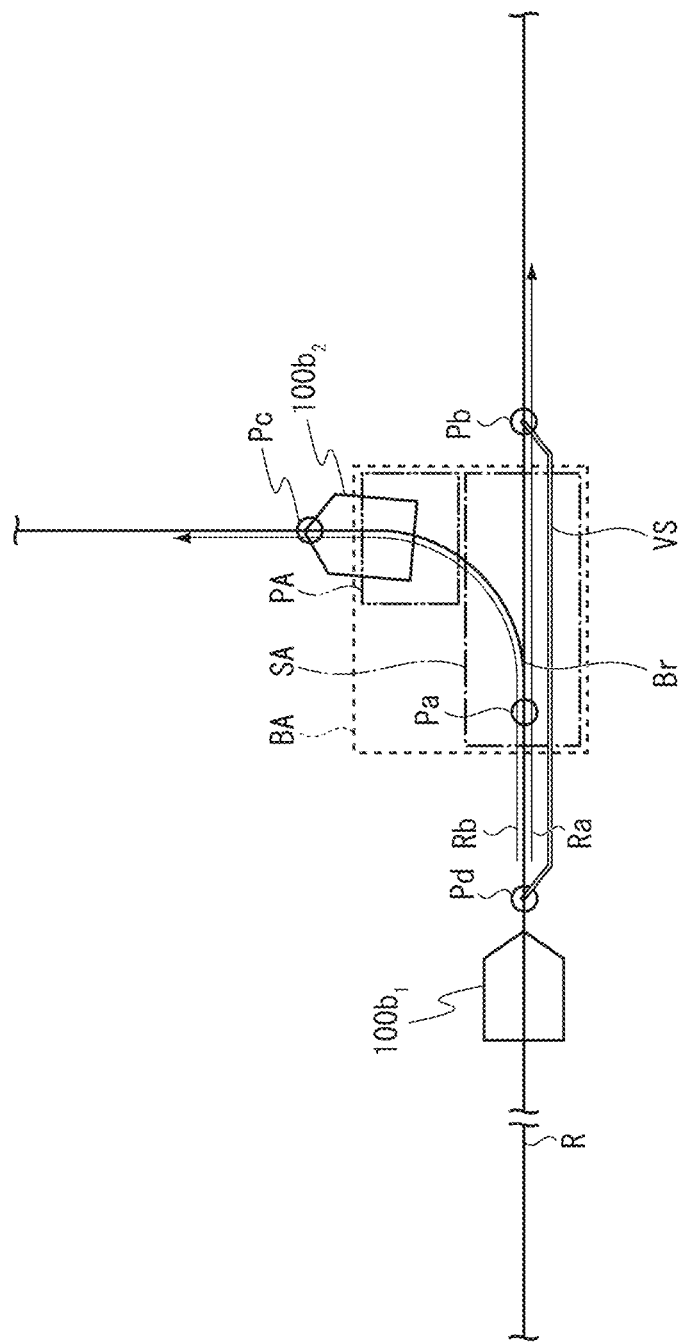
FIG. 25 is a diagram showing an example of the traveling vehicle entering the specific area according to the second preferred embodiment of the present invention.
Figure 26:
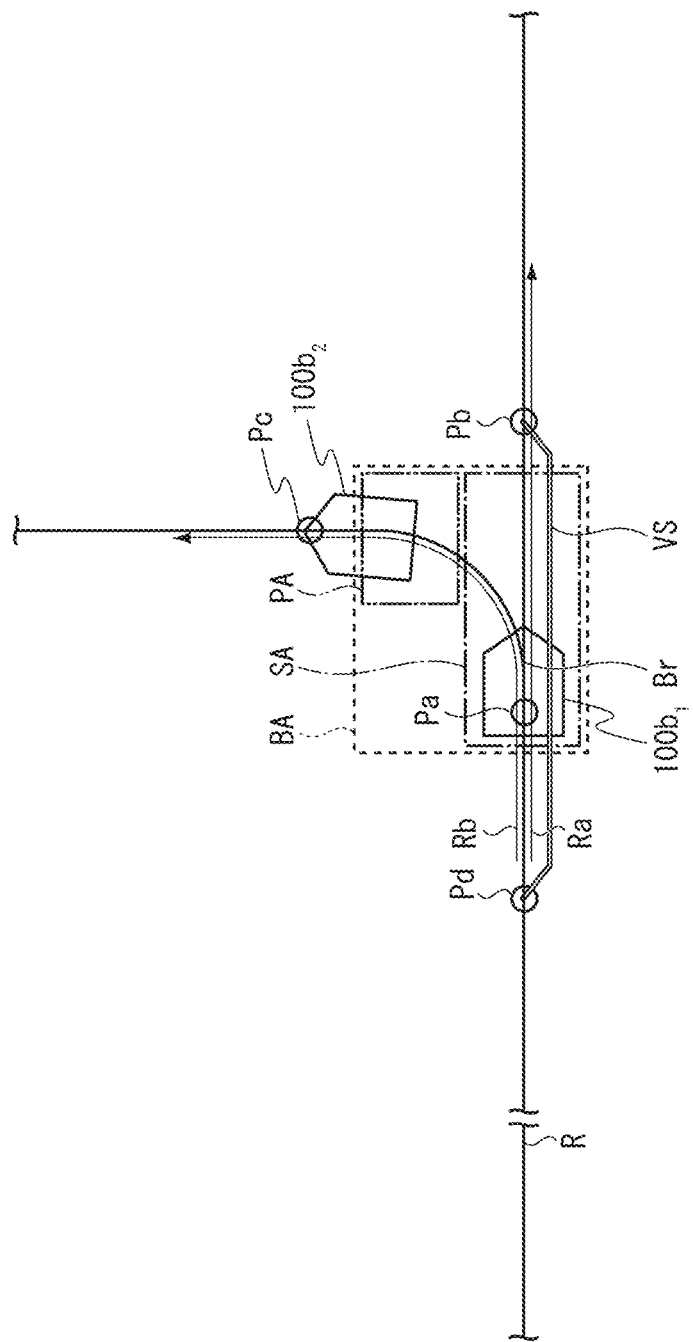
FIG. 26 is a diagram showing an example of the traveling vehicle entering the specific area according to the second preferred embodiment of the present invention.

FIG. 23 is a flowchart showing an example of the flow of processing performed by the traveling vehicle when entering the blocking area or the specific area according to the second preferred embodiment. The entry of the traveling vehicle 100b into the specific area SA described in FIG. 23 takes place as a result of the schedule of traveling in the direction of the traveling path Rb having been switched to the schedule of traveling in the direction of the traveling path Ra. FIG. 24 to FIG. 26 are used in the description of FIG. 23, where appropriate. FIG. 24 to FIG. 26 are diagrams showing an example of the traveling vehicle entering the specific area according to the second preferred embodiment.

In FIG. 23, described is a case where a traveling vehicle 100*b*1 traveling at an upstream side location away by certain distances or more from the blocking area BA and the point Pd transmits a passage request for the blocking area BA in a situation where another traveling vehicle 100*b*2 is present in the predetermined area PA (see FIG. 24). As shown in FIG. 23, the communicator 112 transmits to the controller 200 a passage request for the blocking area BA (Step S901). The traveling controller 111*b* determines whether a passage permission for the blocking area BA has been received (Step S902). At this time, if a passage permission for the blocking area BA has been received (Step S902: YES), the traveling controller 111*b* causes the traveling vehicle to enter the blocking area BA based on a travel segment (Step S903). Here, travel segments at the time when the traveling vehicle 100*b*1 enters the blocking area BA are a travel segment between the point Pd and the point Pa and a travel segment between the point Pa and the point Pc.

If a passage permission for the blocking area BA has not been received (Step S902: NO), the traveling controller 111*b* determines whether branch information has been acquired (Step S904). Specifically, if the communicator 112 has not received a passage permission for the blocking area BA from the controller 200, the traveling controller 111*b* determines whether branch information has been acquired from the point Pd. At this time, if the branch information has not been acquired from the point Pd (Step S904: NO), the traveling controller 111*b* again executes the process of Step S901.

On the other hand, if branch information has been acquired from the point Pd (Step S904: YES), the traveling controller 111*b* determines whether a predetermined period of time has elapsed since the traveling vehicle stopped in the vicinity of the point Pd (since branch information has been acquired from the point Pd) (Step S905). Here, acquisition of branch information from the point Pd is realized when the traveling vehicle 100*b*1 has traveled to the vicinity of the point Pd (see FIG. 25). This means that the traveling vehicle 100*b*1 has traveled to the vicinity of the point Pd (stopped in the vicinity of the point Pd) without having obtained a passage permission for the blocking area BA. Now, if branch information has been acquired from the point Pd, the traveling controller 111*b* determines whether a predetermined period of time has elapsed since the traveling vehicle stopped in the vicinity of the point Pd (since branch information has been acquired from the point Pd) in order to switch the traveling route from the traveling path Rb to the traveling path Ra. If the predetermined period of time has not elapsed (Step S905: NO), the process of Step S901 is executed again.

If the traveling controller 111*b* determines the predetermined period of time as having elapsed since the traveling vehicle stopped in the vicinity of the point Pd (since branch information has been acquired from the point Pd) (Step S905: YES), the communicator 112 transmits a passage request for the specific area SA to the controller 200 (Step S906). The traveling controller 111*b* determines whether a passage permission for the specific area SA has been received (Step S907). At this time, if a passage permission for the specific area SA has not been received (Step S907: NO), the traveling controller 111*b* again executes the process of Step S906. On the other hand, if a passage permission for the specific area SA has been received (Step S907: YES), the traveling controller 111*b* causes the traveling vehicle to enter the specific area SA based on the virtual segment VS (Step S908). Specifically, if the communicator 112 has received a passage permission for the specific area SA from the controller 200, the traveling controller 111*b* causes the traveling vehicle to enter the specific area SA in order to travel based on the virtual segment VS between the point Pd and the point Pb (see FIG. 26).

Figure 27:
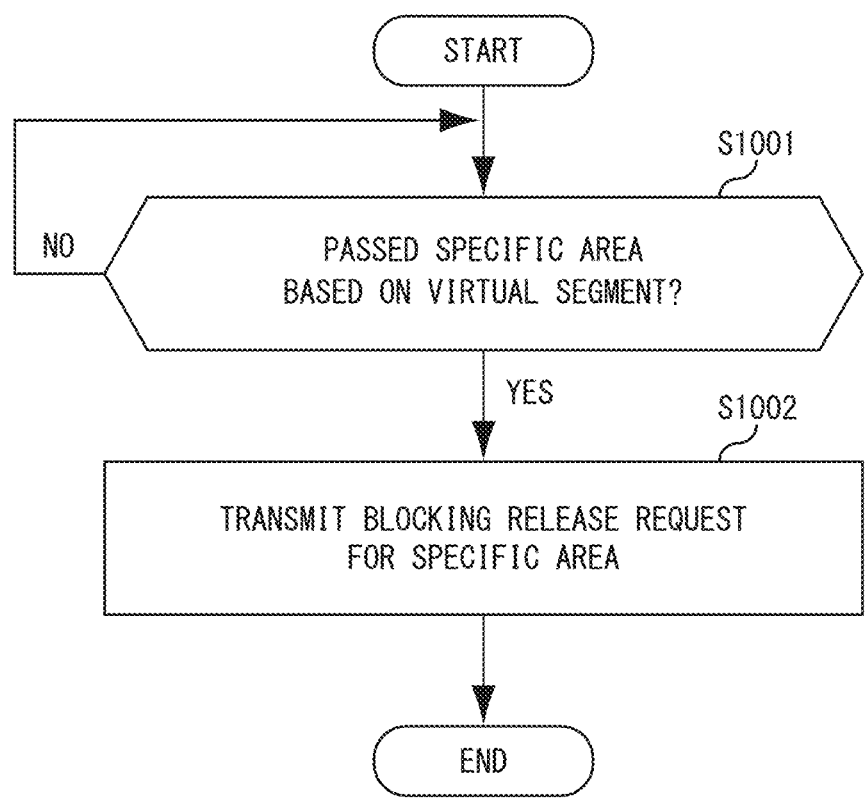
FIG. 27 is a flowchart showing an example of the flow of processing performed by the traveling vehicle when passing through the specific area according to the second preferred embodiment of the present invention.
Figure 28:
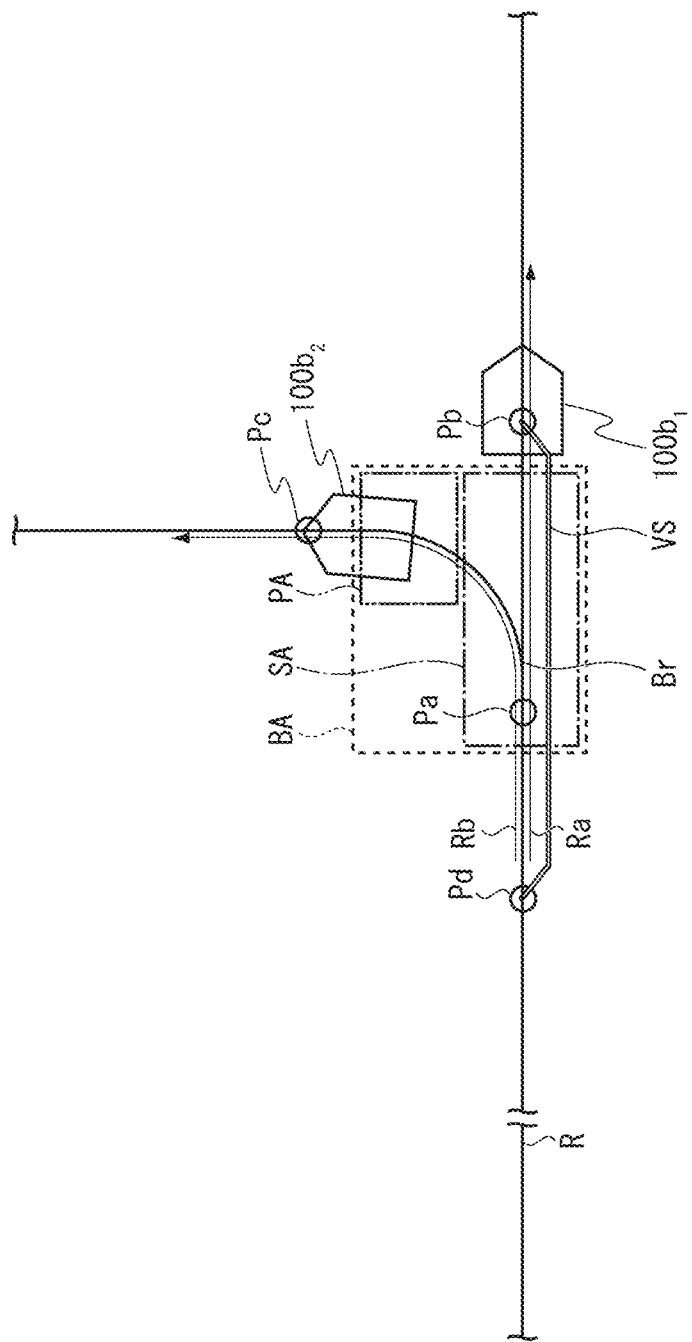
FIG. 28 is a diagram showing an example of the traveling vehicle passing through the specific area according to the second preferred embodiment of the present invention.
Figure 29:
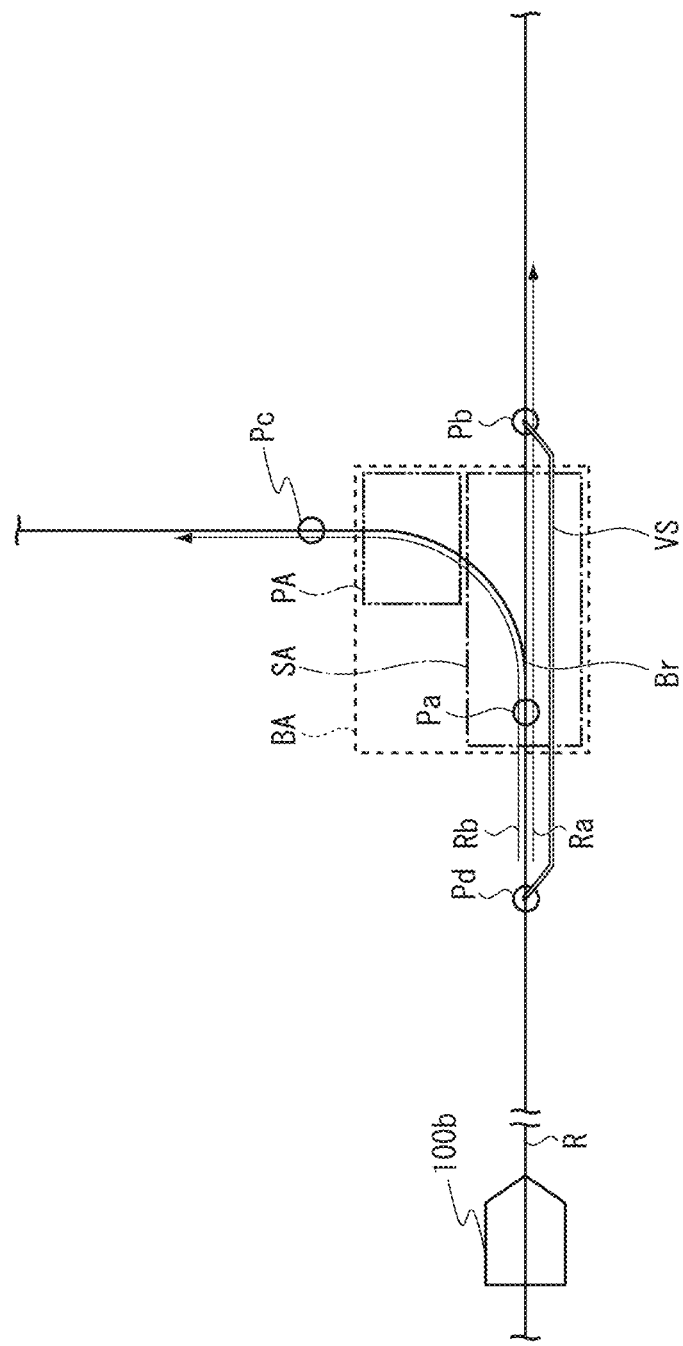
FIG. 29 is a diagram showing an example of the traveling vehicle passing through the blocking area according to the second preferred embodiment of the present invention.
Figure 30:
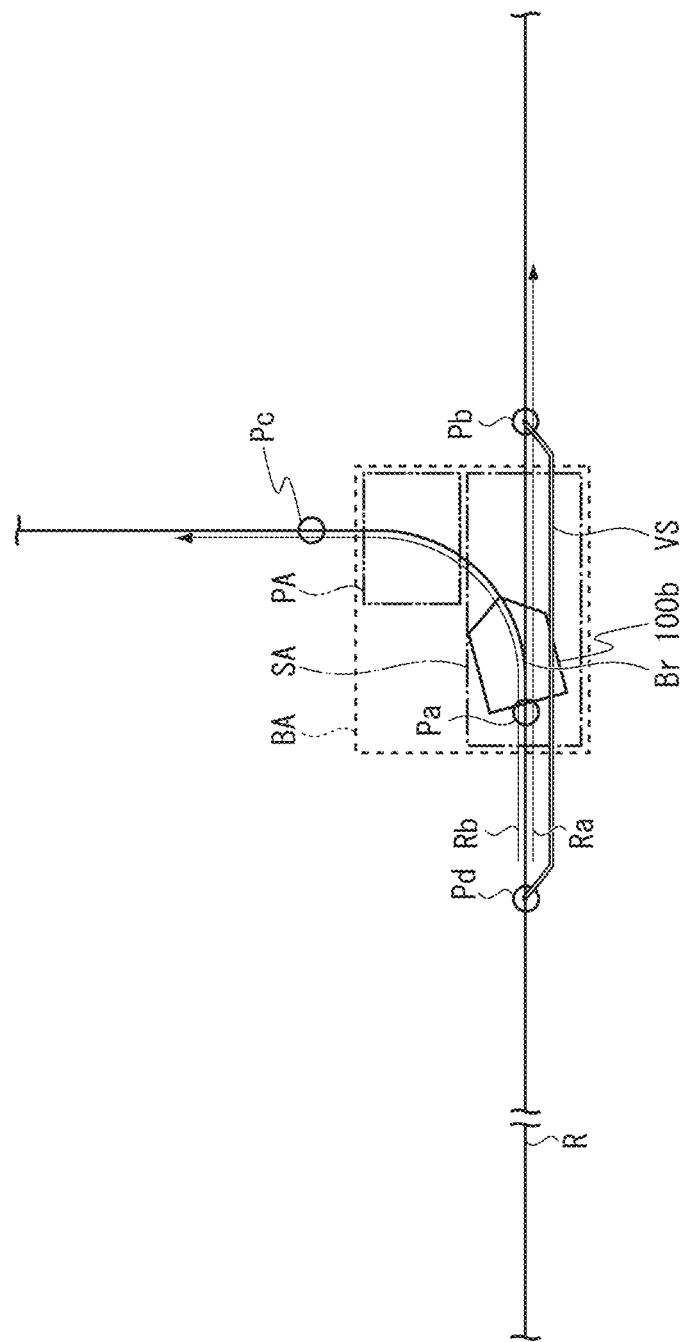
FIG. 30 is a diagram showing an example of the traveling vehicle passing through the blocking area according to the second preferred embodiment of the present invention.
Figure 31:
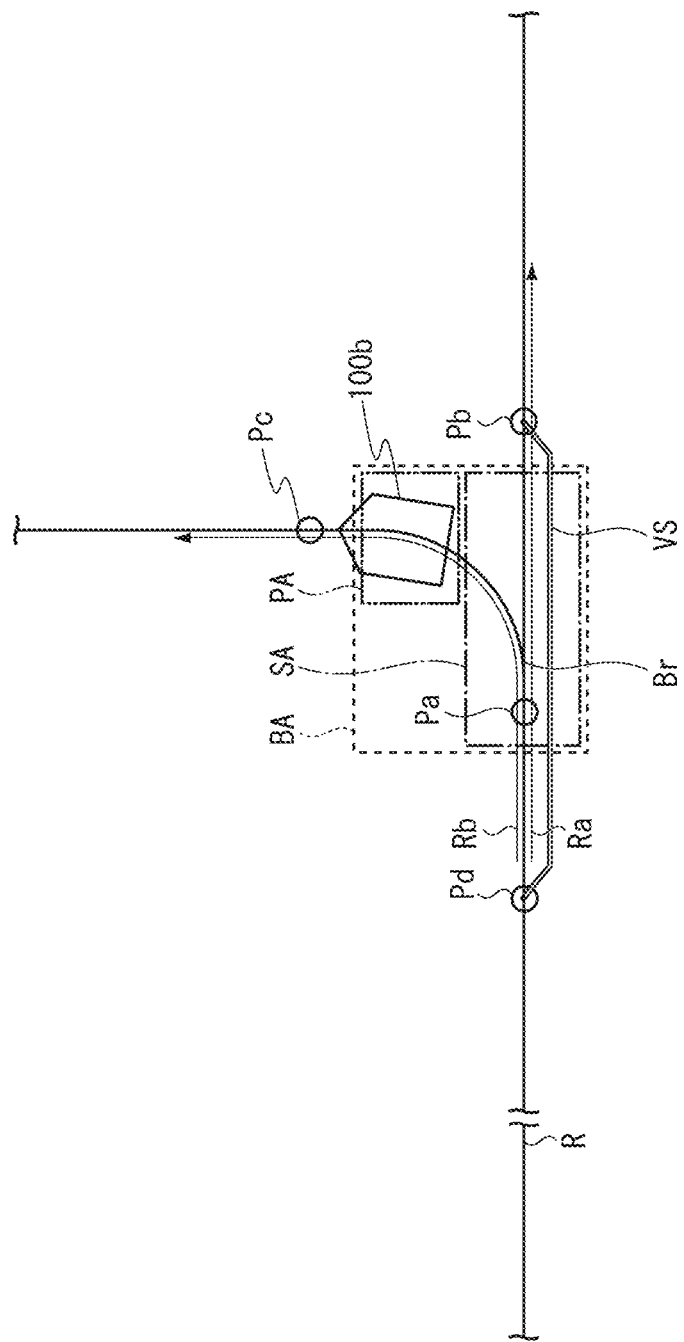
FIG. 31 is a diagram showing an example of the traveling vehicle passing through the blocking area according to the second preferred embodiment of the present invention.
Figure 32:
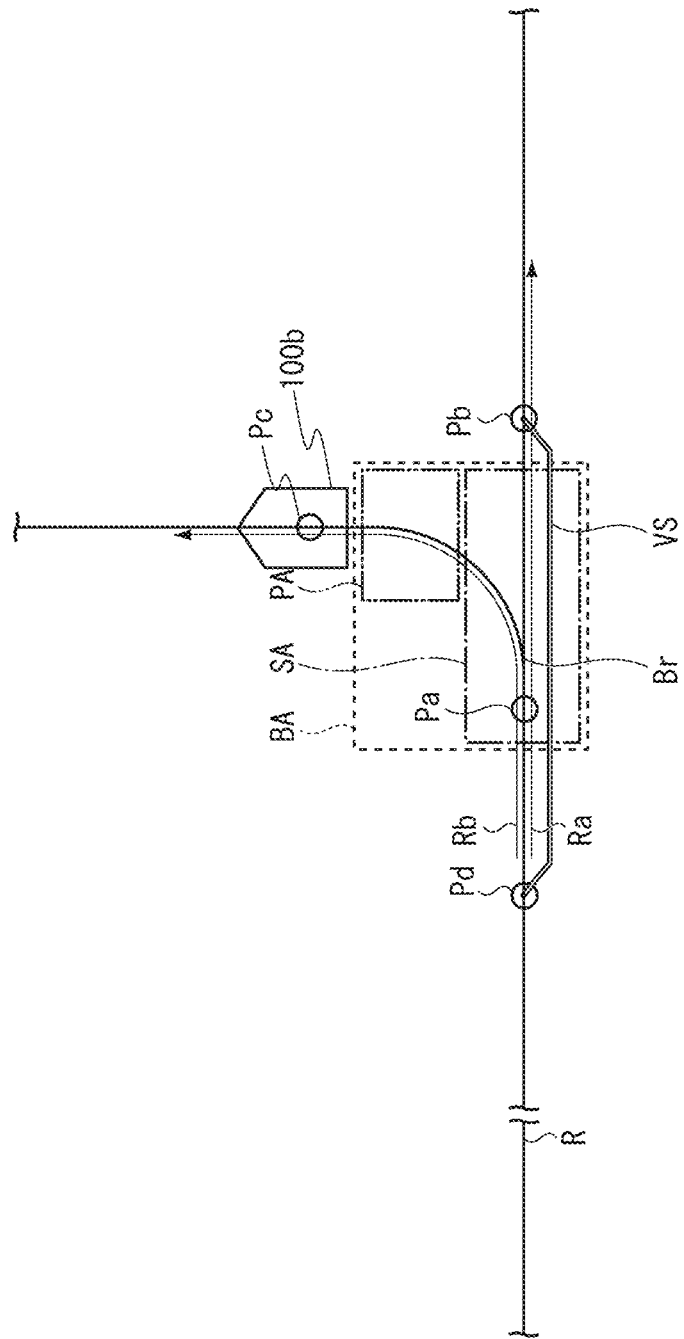
FIG. 32 is a diagram showing an example of the traveling vehicle passing through the blocking area according to the second preferred embodiment of the present invention.

FIG. 27 is a flowchart showing an example of the flow of processing performed by the traveling vehicle when passing through the specific area according to the second preferred embodiment. In the description of FIG. 27, FIG. 28 is used where appropriate. FIG. 28 is a diagram showing an example of the traveling vehicle passing through the specific area according to the second preferred embodiment.

As shown in FIG. 27, the traveling controller 111*b* determines whether the specific area SA has been passed through by traveling based on the virtual segment VS (Step S1001). Specifically, the traveling controller 111*b* determines whether the specific area SA has been passed through, from the current location taking into consideration the traveled distance from the point Pd or from the current location obtained by detecting the location marker at the point Pb. At this time, if the specific area SA has not been passed through (Step S1001: NO), the traveling controller 111*b* again executes the process of Step S1001. Specifically, if the current location taking into consideration the traveled distance from the point Pd is within the specific area SA, or if the location marker at the point Pb has not been detected, the traveling controller 111*b* repeatedly executes the process of Step S1001 until the specific area SA has been passed through.

On the other hand, if the specific area SA has been passed through (Step S1001: YES), the traveling controller 111*b* instructs the communicator 112 to transmit to the controller 200 a blocking release request for the specific area SA that has been passed through (Step S1002). Specifically, if the current location taking into consideration the traveled distance from the point Pd is outside the specific area SA (see FIG. 28), or if detection of the location marker at the point Pb reveals that the specific area SA has been passed through (see FIG. 28), the traveling controller 111*b* generates a release request (state information) including the identification information that indicates the specific area SA that has been passed through. Then, the communicator 112 transmits to the controller 200 the state information including the blocking release request for the specific area SA that has been passed through. It should be noted that the traveling vehicle 100*b*1 may make multiple transmissions of the state information including the release request corresponding to the specific area SA that has been passed through.

FIG. 29 to FIG. 32 are diagrams showing an example of the traveling vehicle passing through the blocking area according to the second preferred embodiment. Described is, for example, a case where a traveling vehicle 100*b* traveling at an upstream side location away by certain distances from the blocking area BA and the point Pd transmits a passage request for the blocking area BA in a situation where no other traveling vehicle 100*b* is present in the blocking area BA (see FIG. 29).

The traveling vehicle 100*b* transmits a passage request for the blocking area BA to the controller 200 and receives a passage permission for the blocking area BA from the controller 200. Then, the traveling vehicle 100*b* enters the blocking area BA in order to travel based on the travel segment between the point Pd and the point Pa and the travel segment between the point Pa and the point Pc (see FIG. 30). Subsequently, if the current location taking into consideration the traveled distance from the point Pa is outside the specific area SA (see FIG. 31), the traveling vehicle 100b generates a release request (state information) including the identification information that indicates the specific area SA that has been passed through. Then, the traveling vehicle 100b transmits to the controller 200 the state information including the blocking release request for the specific area SA that has been passed through.

Subsequently, if the current location taking into consideration the traveled distance from the point Pa is outside the blocking area BA (see FIG. 32), or if the blocking area BA has been passed through as indicated upon detection of the location marker at the point Pc (see FIG. 32), the traveling vehicle 100b generates a release request (state information) including the identification information that indicates the blocking area BA that has been passed through. Then, the traveling vehicle 100b transmits to the controller 200 the state information including the blocking release request for the blocking area BA that has been passed through.

In the traveling vehicle system SYS2, a point capable of providing branch information is provided outside the blocking area BA, and the traveling vehicle 100b enters the specific area SA based on a segment (virtual segment VS) ignoring the point within the blocking area BA. As a result, it is possible to appropriately control passage requests for the specific area SA.

In the preferred embodiments described above, the controller 200 includes, for example, a computer system. The controller 200 reads a control program stored in the memory storage 240 and executes various processes according to the read control program. The control program causes, for example, a computer to execute processes of: transmitting, upon receiving a passage request for the blocking area from the traveling vehicle, a passage permission for the blocking area to the traveling vehicle that issued the passage request for the blocking area if no other traveling vehicle is present in the blocking area; causing the traveling vehicle to enter the blocking area if the passage permission for the blocking area is acquired by the traveling vehicle; transmitting, upon receiving a passage request for the specific area from the traveling vehicle, a passage permission for the specific area to the traveling vehicle that issued the passage request for the specific area if no other traveling vehicle is present in the specific area; and causing the traveling vehicle to enter the specific area if the passage permission for the specific area is acquired by the traveling vehicle. The control program may be stored and provided in a computer-readable storage medium.

Figure 33:
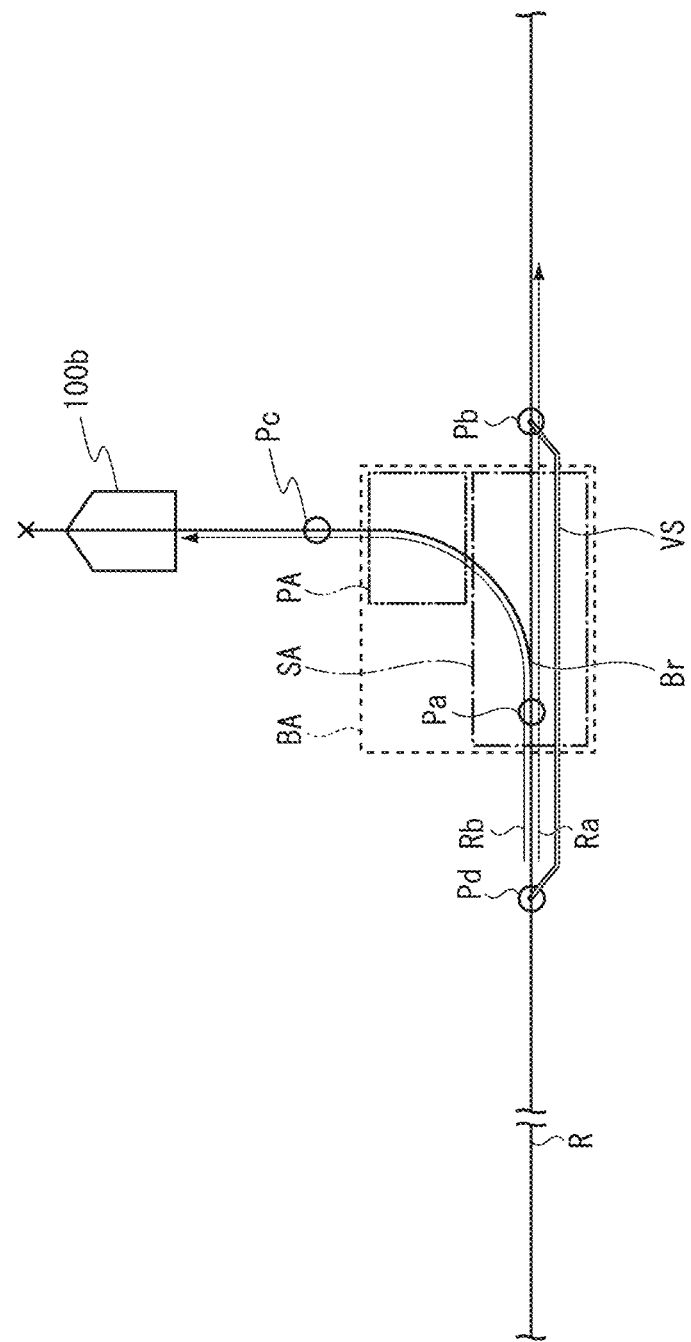
FIG. 33 is a diagram showing an example of the traveling vehicle passing through the blocking area by means of a switchback operation.
Figure 34:
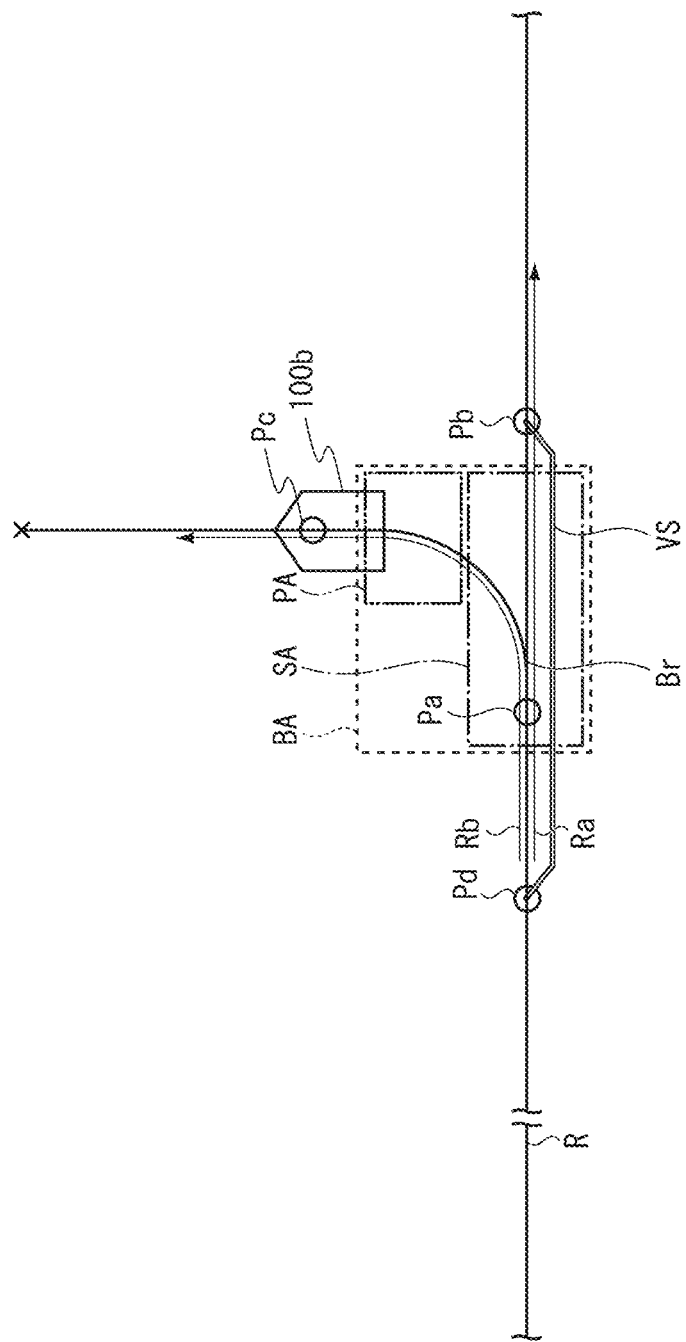
FIG. 34 is a diagram showing an example of the traveling vehicle passing through the blocking area by means of the switchback operation.
Figure 35:
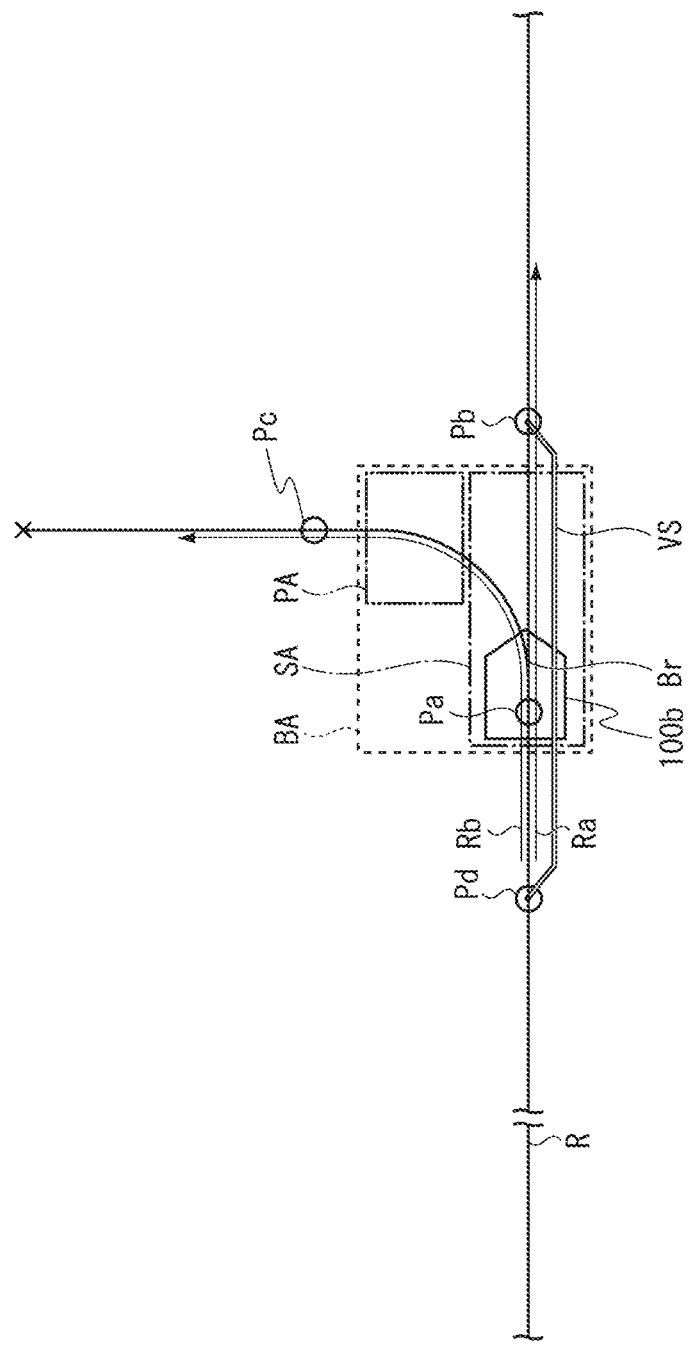
FIG. 35 is a diagram showing an example of the traveling vehicle passing through the blocking area by means of the switchback operation.
Figure 36:
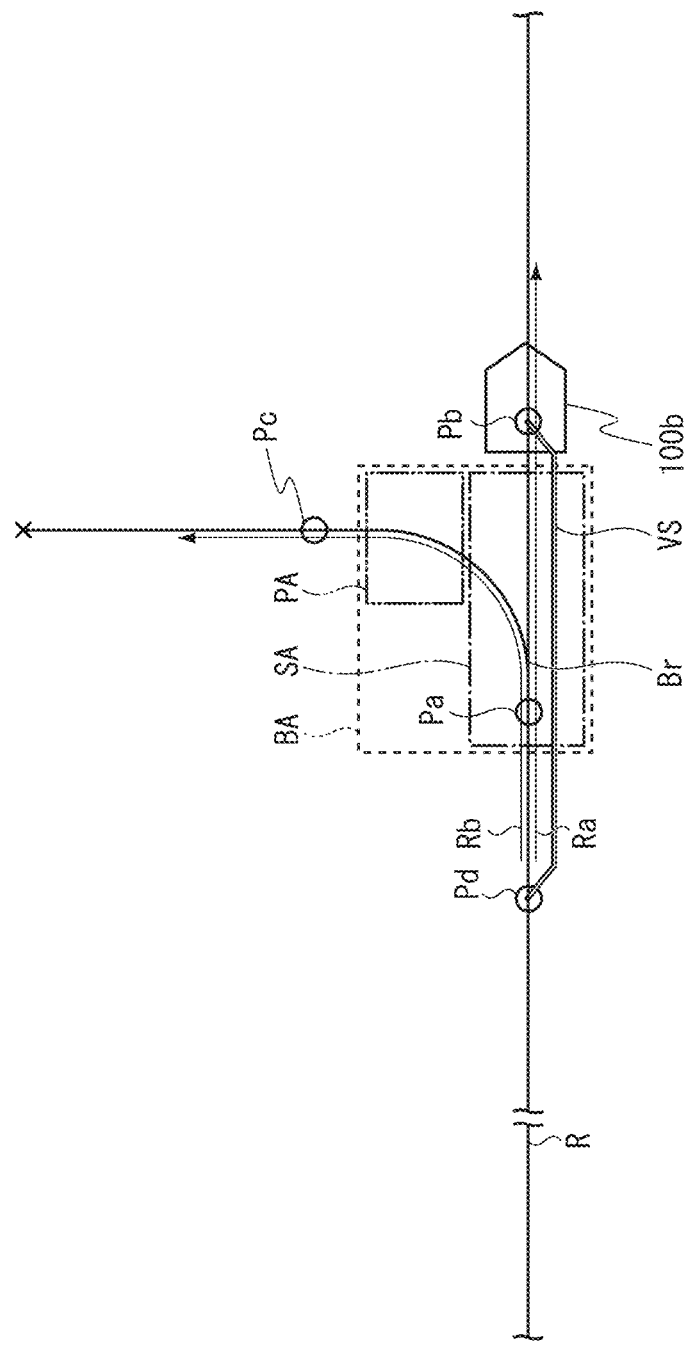
FIG. 36 is a diagram showing an example of the traveling vehicle passing through the blocking area by means of the switchback operation.

The preferred embodiments described above can also be realized on a traveling path R that enables a switchback operation. FIG. 33 to FIG. 36 are diagrams showing an example of the traveling vehicle passing through the blocking area via a switchback operation. Described is a case where, as shown in FIG. 33, ahead of the traveling path Rb is a dead end, for example. In the case where ahead of the traveling path Rb is a dead end, the traveling vehicle 100b moves backward and passes through the blocking area BA by performing a switchback operation. At this time, the point Pa serves as a switching point (switchback point) at which the traveling vehicle 100b that has moved backward switches its traveling direction to the direction of the traveling path Ra.

The traveling vehicle 100b transmits to the controller 200 a passage request for the blocking area BA (see FIG. 33). Upon receiving the passage permission for the blocking area BA from the controller 200, the traveling vehicle 100b travels (moves backward) toward the point Pa, which serves as a switching point (switchback point), based on the travel segment between the point Pc and the point Pa (see FIG. 34). Having moved back to the point Pa, the traveling vehicle 100b travels based on the travel segment between the point Pa and the point Pb (see FIG. 35). Upon having passed through the blocking area BA, the traveling vehicle 100b transmits to the controller 200 a release request for the blocking area BA through which it has just passed (see FIG. 36). The controller 200 releases the blocking of the blocking area BA in accordance with the release request from the traveling vehicle 100b.

The preferred embodiments of the present invention have been described above. However, the technical scope of the present invention is not limited to the description of the above preferred embodiments. It is apparent to those skilled in the art that various modifications or improvements can be added to the above preferred embodiments. The technical scope of the present invention also encompasses one or more of such modifications or improvements. One or more of the elements or features described in the above preferred embodiments may be omitted in some cases. Also, one or more of the elements or features described in the above preferred embodiments may be combined where appropriate. The order of executing processes shown in the present preferred embodiment can be realized in an arbitrary order unless an output of the previous processing is used in the following processing. While operations in the above preferred embodiments have been described with expressions such as "first", "next", and "subsequently" for the sake of convenience, the operations need not always be implemented in that order. The contents of all documents cited in the detailed description of the present invention are incorporated herein by reference to the extent permitted by law.

One or more of the elements or features described in the above preferred embodiments may be omitted in some cases. One or more of the requirements described in the above preferred embodiments may be combined where appropriate. The contents of Japanese Patent Application No. 2020-092386 and all documents cited in the detailed description of the present invention are incorporated herein by reference to the extent permitted by law.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling vehicle system comprising:
a traveling path including a branching portion;
a traveling vehicle to travel on the traveling path; and
a controller; wherein
a portion of a blocking area set to include the branching portion includes a specific area set to allow the traveling vehicle to pass on one of the traveling paths from an upstream side to a downstream side of the branching portion and not to allow the traveling vehicle to pass on other of the traveling paths from an upstream side to a downstream side of the branching portion;
the controller is configured or programmed to transmit, upon receiving a passage request for the blocking area from the traveling vehicle scheduled to travel along the other of the traveling paths, a passage permission for the blocking area to the traveling vehicle that issued the passage request for the blocking area if no other traveling vehicle is present in the blocking area;

the traveling vehicle enters the blocking area if the passage permission for the blocking area is acquired;

the controller is configured or programmed to transmit, upon receiving a passage request for the specific area from the traveling vehicle scheduled to travel along the one of the traveling paths, a passage permission for the specific area to the traveling vehicle that issued the passage request for the specific area if no other traveling vehicle is present in the specific area; and the traveling vehicle enters the specific area if the passage permission for the specific area is acquired.

2. The traveling vehicle system according to claim 1, wherein the traveling vehicle having acquired a passage permission for the blocking area transmits a blocking release request for the specific area to the controller after having passed through the specific area within the blocking area;

the controller is configured or programmed to release blocking of the specific area and set the specific area to allow passage therethrough, in response to the blocking release request for the specific area;

the traveling vehicle having acquired a passage permission for the blocking area transmits a blocking release request for the blocking area to the controller after having transmitted the blocking release request for the specific area and then passed through the blocking area; and the controller is configured or programmed to release blocking of the blocking area and set the blocking area to allow passage therethrough, in response to the blocking release request for the blocking area.

3. The traveling vehicle system according to claim 1, wherein the traveling path includes a first point that provides, at a location short of the branching portion, the traveling vehicle with branch information indicating a branching path being present;

if the traveling vehicle acquires the branch information in a situation where the traveling vehicle has not acquired a passage permission for the blocking area or the specific area, the traveling vehicle transmits a passage request for the specific area to the controller; and if the first point is present within the blocking area, a second point that is located short of the first point and is closer to the first point, among a plurality of points provided on the traveling path outside the blocking area, is set to be able to provide the branch information to the traveling vehicle.

4. The traveling vehicle system according to claim 3, wherein if the traveling vehicle acquires a passage permission for the specific area in a situation where the traveling vehicle is traveling based on a travel segment between adjacent points on the traveling path and the second point has been set to be able to provide the branch information, the traveling vehicle travels based on a virtual segment from the second point to a point on one of the traveling paths.

5. The traveling vehicle system according to claim 4, wherein the virtual segment is preliminarily created and held in the traveling vehicle or the controller and is fetched or is acquired from the controller for use when the traveling vehicle acquires a passage permission for the specific area.

6. The traveling vehicle system according to claim 3, wherein of the traveling path, ahead of the other of the traveling paths is a dead end; and the first point is a switching point at which the traveling vehicle that has moved backward after entering the other of the traveling paths switches its traveling direction to the one of the traveling paths.

7. The traveling vehicle system according to claim 1, wherein if the traveling vehicle does not acquire a passage permission for the blocking area after transmitting a passage request for the blocking area to the controller, the traveling vehicle transmits a passage request for the specific area to the controller.

8. The traveling vehicle system according to claim 7, wherein if the traveling vehicle does not acquire a passage permission for the blocking area after transmitting a passage request for the blocking area to the controller, the traveling vehicle transmits a passage request for the specific area to the controller while being at a stop.

9. A traveling vehicle control method for controlling a traveling vehicle traveling on a traveling path including a branching portion, a portion of a blocking area set to include the branching portion includes a specific area set to allow the traveling vehicle to pass on one of a plurality of traveling paths from an upstream side to a downstream side of the branching portion and not to allow the traveling vehicle to pass on other of the traveling paths from an upstream side to a downstream side of the branching portion, the method comprising:

transmitting, upon receiving a passage request for the blocking area from the traveling vehicle scheduled to travel along the other of the traveling paths, a passage permission for the blocking area to the traveling vehicle that issued the passage request for the blocking area if no other traveling vehicle is present in the blocking area;

causing the traveling vehicle to enter the blocking area if the passage permission for the blocking area is acquired by the traveling vehicle;

transmitting, upon receiving a passage request for the specific area from the traveling vehicle scheduled to travel along the one of the traveling paths, a passage permission for the specific area to the traveling vehicle that issued the passage request for the specific area if no other traveling vehicle is present in the specific area; and causing the traveling vehicle to enter the specific area if the passage permission for the specific area is acquired by the traveling vehicle.

\* \* \* \* \*